US008866357B2

(12) United States Patent
Yamasaki et al.

(10) Patent No.: US 8,866,357 B2
(45) Date of Patent: Oct. 21, 2014

(54) DRIVE DEVICE

(75) Inventors: Masashi Yamasaki, Obu (JP); Hiroshi Imai, Toyohashi (JP)

(73) Assignees: Denso Corporation, Kariya (JP); Asmo Co., Ltd., Kosai (JP)

( * ) Notice: Subject to any disclaimer, the term of this patent is extended or adjusted under 35 U.S.C. 154(b) by 380 days.

(21) Appl. No.: 13/331,072

(22) Filed: Dec. 20, 2011

(65) Prior Publication Data
US 2012/0161590 A1 Jun. 28, 2012

(30) Foreign Application Priority Data
Dec. 28, 2010 (JP) ................................. 2010-292290
Mar. 30, 2011 (JP) ................................. 2011-74880

(51) Int. Cl.
*H02K 5/22* (2006.01)
*H02K 11/00* (2006.01)
*H02K 11/04* (2006.01)
*H02K 29/06* (2006.01)

(52) U.S. Cl.
CPC ............ *H02K 11/0073* (2013.01); *H02K 5/225* (2013.01); *H02K 2211/03* (2013.01)
USPC ............................. 310/89; 310/68 R; 310/71

(58) Field of Classification Search
CPC ....... H02K 5/22; H02K 5/225; H02K 11/044; H02K 29/06; H02K 29/08; H02K 29/10; H02K 29/12
USPC .................................. 310/68 B, 71, 68 R, 89
See application file for complete search history.

(56) References Cited

U.S. PATENT DOCUMENTS

| | | | |
|---|---|---|---|
| 5,889,378 A | 3/1999 | Hayashi | |
| 5,932,942 A | 8/1999 | Patyk et al. | |
| 6,081,056 A * | 6/2000 | Takagi et al. | ............... 310/68 B |
| 6,429,553 B1 | 8/2002 | Taniguchi et al. | |
| 6,577,030 B2 | 6/2003 | Tominaga et al. | |
| 7,042,122 B1 | 5/2006 | Dufala et al. | |
| 7,436,138 B2 | 10/2008 | Beifus | |
| 2002/0117908 A1* | 8/2002 | Sanchez et al. | ................. 310/51 |
| 2002/0117914 A1 | 8/2002 | Doi et al. | |
| 2002/0118010 A1 | 8/2002 | Pointer | |

(Continued)

FOREIGN PATENT DOCUMENTS

| | | |
|---|---|---|
| CN | 1067495 | 12/1992 |
| DE | 19723664 | 12/1997 |

(Continued)

OTHER PUBLICATIONS

U.S. Appl. No. 13/331,131, filed Dec. 20, 2011, Yamasaki et al.

(Continued)

*Primary Examiner* — Michael Andrews
(74) *Attorney, Agent, or Firm* — Harness, Dickey & Pierce, PLC

(57) ABSTRACT

A drive device includes a motor, a control unit, a first fastener, and a second fastener. The control unit is arranged on a side of the motor in an axis direction of the motor. The first fastener is arranged in a wall part of a cylindrical motor case of the motor opposing to the control unit, on an inner side of a peripheral wall of the motor case in a radial direction. The second fastener is tightened with the first fastener so as to connect the motor and the control unit with each other.

15 Claims, 24 Drawing Sheets

(56) References Cited

U.S. PATENT DOCUMENTS

| | | | |
|---|---|---|---|
| 2003/0047304 A1* | 3/2003 | Kasuga | 165/185 |
| 2003/0127921 A1 | 7/2003 | Akutsu et al. | |
| 2004/0104628 A1 | 6/2004 | Streng et al. | |
| 2005/0029879 A1* | 2/2005 | Endo et al. | 310/75 C |
| 2006/0006094 A1 | 1/2006 | Hofmann et al. | |
| 2006/0267431 A1* | 11/2006 | Johnson et al. | 310/71 |
| 2007/0145836 A1 | 6/2007 | Bostwick | |
| 2007/0200439 A1* | 8/2007 | Nagahashi et al. | 310/54 |
| 2009/0127945 A1* | 5/2009 | Hino et al. | 310/68 D |
| 2010/0181853 A1 | 7/2010 | Wong et al. | |
| 2011/0254393 A1 | 10/2011 | Yamasaki et al. | |

FOREIGN PATENT DOCUMENTS

| | | |
|---|---|---|
| DE | 29 904361 | 5/1999 |
| DE | 69707226 | 7/2002 |
| DE | 102 45971 | 4/2004 |
| JP | 10-126999 | 5/1998 |
| JP | 2000-217310 | 8/2000 |
| JP | 2002-252958 | 9/2002 |
| JP | 2002-267491 | 9/2002 |
| JP | 2003-204654 A | 7/2003 |
| JP | 2006-187149 | 7/2006 |
| JP | 2008-072776 | 3/2008 |
| JP | 2008-245385 | 10/2008 |
| JP | 2009-011078 | 1/2009 |
| WO | WO 2007/142299 | 12/2007 |

OTHER PUBLICATIONS

Office action dated May 30, 2014 in corresponding German Application No. 10 2011 056365.2.

Office action dated Jun. 5, 2014 in corresponding Japanese Application No. 2011-074880.

Office action Jun. 5, 2014 in corresponding Japanese Application No. 2010-292291.

Office action dated Jun. 6, 2014 in corresponding German Application No. 10 2011 056364.4.

Office action dated Dec. 30, 2013 in corresponding Chinese Application No. 201110441757.0.

Office action dated Jan. 6, 2014 in corresponding Chinese Application No. 201110441868.1.

Office action dated Jul. 21, 2014 in corresponding Chinese Application No. 201110441757.0.

Office action dated Aug. 11, 2014 in corresponding Chinese Application No. 201110441868.1.

Office action dated Jul. 18, 2014 in corresponding U.S. Appl. No. 13/331,131.

\* cited by examiner

DRIVE DEVICE

CROSS REFERENCE TO RELATED APPLICATION

This application is based on Japanese Patent Application No. 2010-292290 filed on Dec. 28, 2010, and Japanese Patent Application No. 2011-74880 filed on Mar. 30, 2011, the disclosures of which are incorporated herein by reference in their entirety.

BACKGROUND OF THE INVENTION

1. Field of the Invention

The present invention relates to a drive device.

2. Description of Related Art

A three-phase motor is known, and is driven to rotate when three-phase AC current is supplied from a power source. In a case where the power source is a DC power source having a predetermined voltage, a controller is necessary for switching a winding current, so as to supply the winding current having different phases to winding wire having plural (e.g., three) phases, respectively.

JP-A-2003-204654 (US2003/0127921) describes a control circuit unit that is arranged parallel with a shaft of a motor and that is connected to a housing located on an output side of the motor.

However, when the control circuit unit is arranged parallel with the shaft of the motor, a size of the whole device becomes large in a radial direction.

SUMMARY OF THE INVENTION

The present invention is made in view of the above matters, and it is an object of the present invention to make the size of the drive device smaller in the radial direction.

According to an example of the present invention, a drive device includes a motor, a control unit, a first fastener and a second fastener. The motor has a motor case having a cylindrical shape; a stator arranged in the motor case in a radial direction; a winding wire wound around the stator so as to define plural phases; a rotor arranged in the stator in the radial direction and being rotatable relative to the stator; and a shaft rotated with the rotor. The control unit has a semiconductor module having a switching element which switches electricity supply to the winding wire; a receiving member that receives the semiconductor module; and a board which is electrically connected to the semiconductor module. The control unit is arranged on a side of the motor in an axis direction of the motor. The first fastener is arranged in a wall part of the motor case opposing to the control unit, on an inner side of a peripheral wall of the motor case in the radial direction. The second fastener is tightened with the first fastener so as to connect the motor and the control unit with each other.

Accordingly, the size of the drive device can be made smaller in the radial direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT (First Embodiment)

A drive device 1 according to a first embodiment will be described with reference to FIGS. 1-16. The drive device 1 is applied to an electric power-steering apparatus (hereinafter referred as EPS), and has a motor 2 and a control unit 3.

Figure 1:
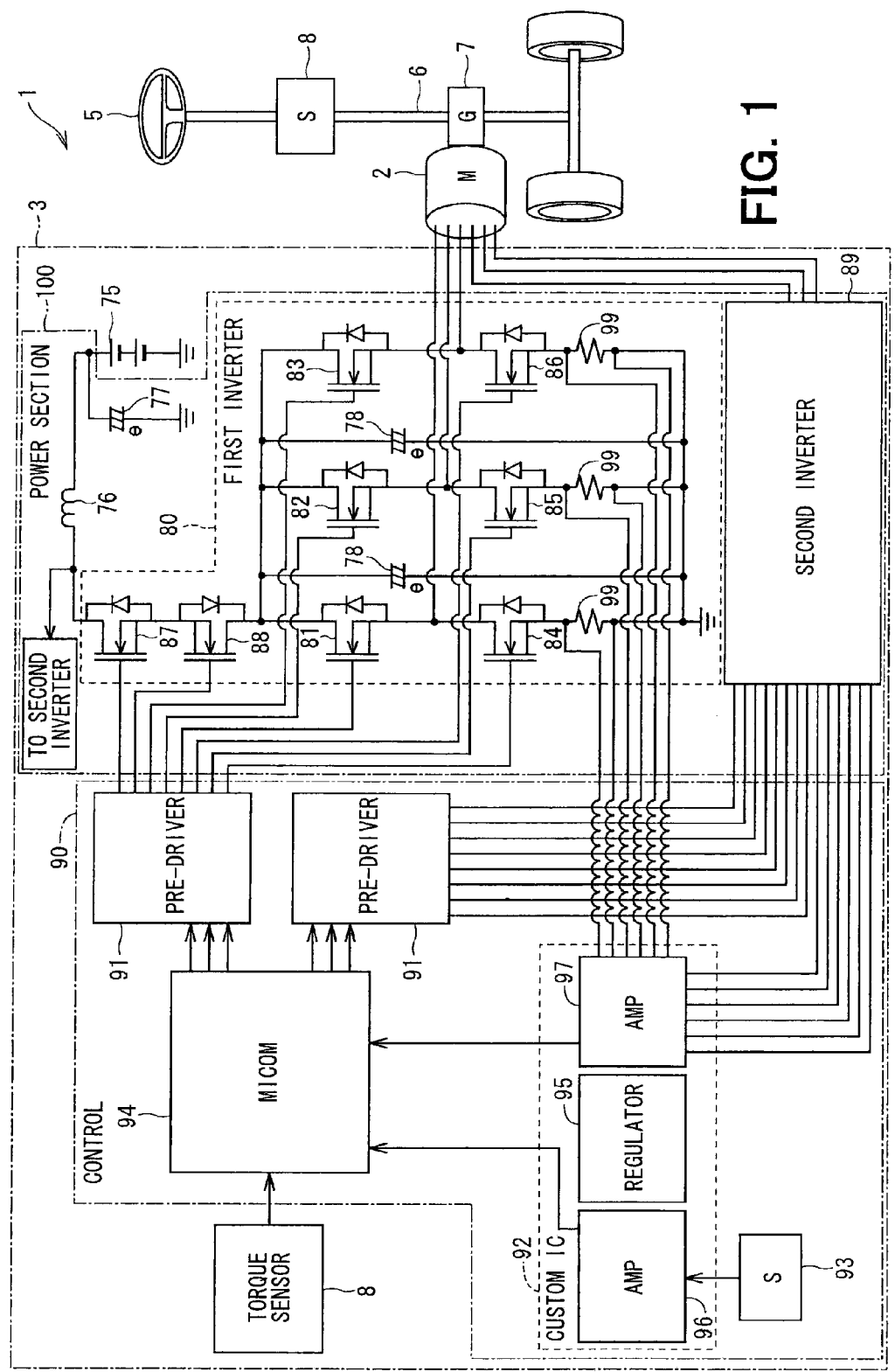
FIG. 1 is a schematic view illustrating a power steering apparatus having a drive device according to a first embodiment.

Referring to FIG. 1, electric construction of the EPS will be explained.

As shown in FIG. 1, a vehicle has a steering 5, a column shaft 6, and a gear 7. The drive device 1 produces rotation torque for the shaft 6 through the gear 7, so as to assist the steering 5.

Specifically, when a driver of the vehicle operates the steering 5, steering torque produced in the column shaft 6 by the operation is detected with a torque sensor 8. Further, speed information of the vehicle is acquired from a controller area network (CAN, not shown), so as to assist the steering 5. If such a mechanism is used, not only the assistance of the steering 5 but also automatic control of the steering 5 is possible such as lane keeping in a highway or parking in a motor pool, depending on control technique.

The motor 2 is a three phase brushless motor, and the gear 7 is rotated in both directions. Energization and drive of the motor 2 are controlled by the control unit 3. The control unit 3 has a power section 100 to which drive current is supplied to drive the motor 2, and a control 90 which controls the drive of the motor 2.

The power section 100 has a choking coil 76 placed in a power source line from a power source 75, a capacitor 77, a first inverter 80 and a second inverter 89. The first inverter 80 and the second inverter 89 have the same composition, so that only the first inverter 80 is explained here.

The inverter 80 has metal-oxide-semiconductor field-effect transistor (MOSFET, hereinafter referred as MOS) 81-86 which is a kind of a field effect transistor. In the MOS 81-86, a source and a drain are connected to (ON) or disconnected from (OFF) each other by a gate potential. The MOS 81-86 corresponds to a switching element.

The drain of the MOS 81 is connected to the source line, and the source of the MOS 81 is connected to the drain of the MOS 84. The source of the MOS 84 is connected to the ground. A connection point between the MOS 81 and the MOS 84 is connected to a U phase coil of the motor 2.

The drain of the MOS 82 is connected to the source line, and the source of the MOS 82 is connected to the drain of the MOS 85. The source of the MOS 85 is connected to the ground. A connection point between the MOS 82 and the MOS 85 is connected to a V phase coil of the motor 2.

The drain of the MOS 83 is connected to the source line, and the source of the MOS 83 is connected to the drain of the MOS 86. The source of the MOS 86 is connected to the ground. A connection point between the MOS 83 and the MOS 86 is connected to a W phase coil of the motor 2.

The inverter 80 has a power relay 87, 88, which is constructed by the same MOSFET as the MOS 81-86. The power relay 87, 88 is arranged between MOS 81-83 and the power source 75, and stops the electric current at the time of abnormalities.

The power relay 87 is disposed to intercept the electric current from flowing into the motor 2 when open or short circuit failure is generated. The power relay 88 is arranged to prevent reverse-direction current that is generated when an electronic component such as capacitor 78 is accidentally connected in reverse direction.

A shunt resistor 99 is electrically connected between the MOS 84-86 and the ground. Electric current supplied to the U phase coil, the V phase coil, and the W phase coil is detected by detecting voltage or current of the shunt resistor 99.

The choking coil 76 and the capacitor 77 are electrically connected between the power source 75 and the power relay 87. The choking coil 76 and the capacitor 77 construct a filter circuit, and reduce noise transmitted from other equipment which shares the power source 75. Moreover, noise transmitted from the drive device 1 to the other equipment is also reduced.

The capacitor 78 is electrically connected between a power source side of the MOS 81-83 and a ground side of the MOS 84-86. The capacitor 78 stores charge, thereby assisting the power supply for the MOS 81-86, or controlling noise components such as surge voltage.

The control 90 has a pre-driver 91, a custom IC 92, a rotation angle sensor 93 corresponding to a rotation detecting element, and a microcomputer 94. The custom IC 92 has a regulator 95, an amplifier 96 that amplifies a sensor signal output from the sensor 93, and an amplifier 97 that amplifies a detection voltage.

The regulator 95 is a stabilization circuit which stabilizes the power source, and stabilizes the power source supplied to each part. For example, the microcomputer 94 will operate with the stable prescribed voltage (for example, 5V), due to the regulator 95.

A signal is input into the amplifier 96 from the sensor 93. The sensor 93 detects the rotation position signal of the motor 2, and the detected signal is sent to the amplifier 96. The amplifier 96 amplifies the signal, and outputs the amplified signal to the microcomputer 94. The amplifier 97 detects the both-ends voltage of the shunt resistor 99, amplifies the voltage, and outputs the amplified voltage to the microcomputer 94.

The rotation position signal of the motor 2 and the both-ends voltage of the shunt resistor 99 are input into the microcomputer 94. Moreover, a steering torque signal is input into the microcomputer 94 from the torque sensor 8 attached to the column shaft 6, and the speed information is input into the microcomputer 94 via the CAN. When the steering torque signal and the speed information are input, the microcomputer 94 will control the first inverter 80 through the pre-driver 91 based on the rotation position signal. The steering 5 can be assisted according to the speed.

Specifically, the microcomputer 94 controls the inverter 80 by switching the MOS 81-86 through the pre-driver 91. The gate of the MOS 81-86 is connected to an output terminal of the pre-driver 91, and the MOS 81-86 is switched by changing the gate voltage through the pre-driver 91.

Moreover, the microcomputer 94 controls the inverter 80 based on the both-ends voltage of the shunt resistor 99 input from the amplifier 97, so that current shape supplied to the motor 2 is made close to a sinusoidal wave. The second inverter 89 is controlled by the control 90, similarly to the first inverter 80.

Figure 2:
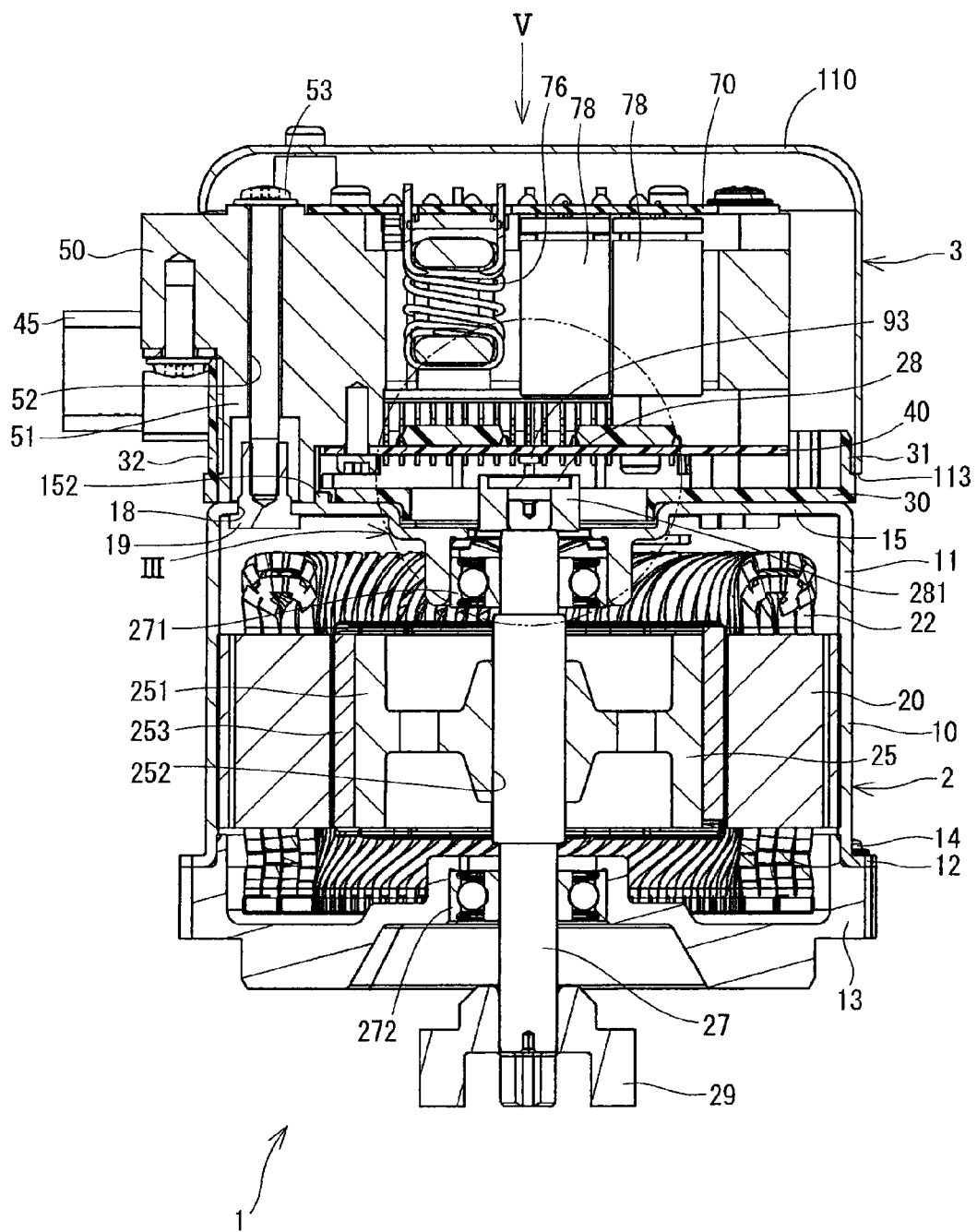
FIG. 2 is a cross-sectional view illustrating the drive device.
Figure 3:
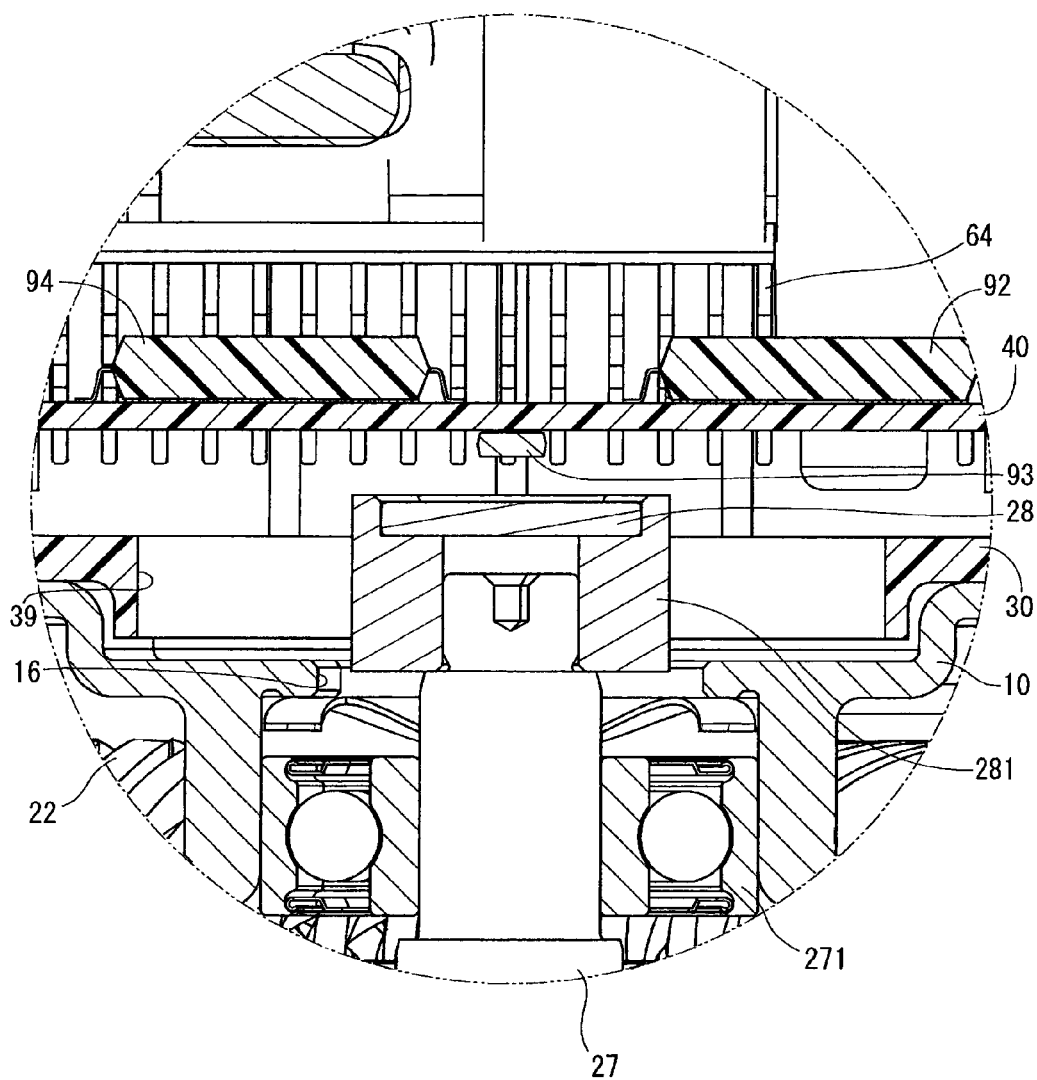
FIG. 3 is an enlarged view of a circle III in FIG. 2.
Figure 4:
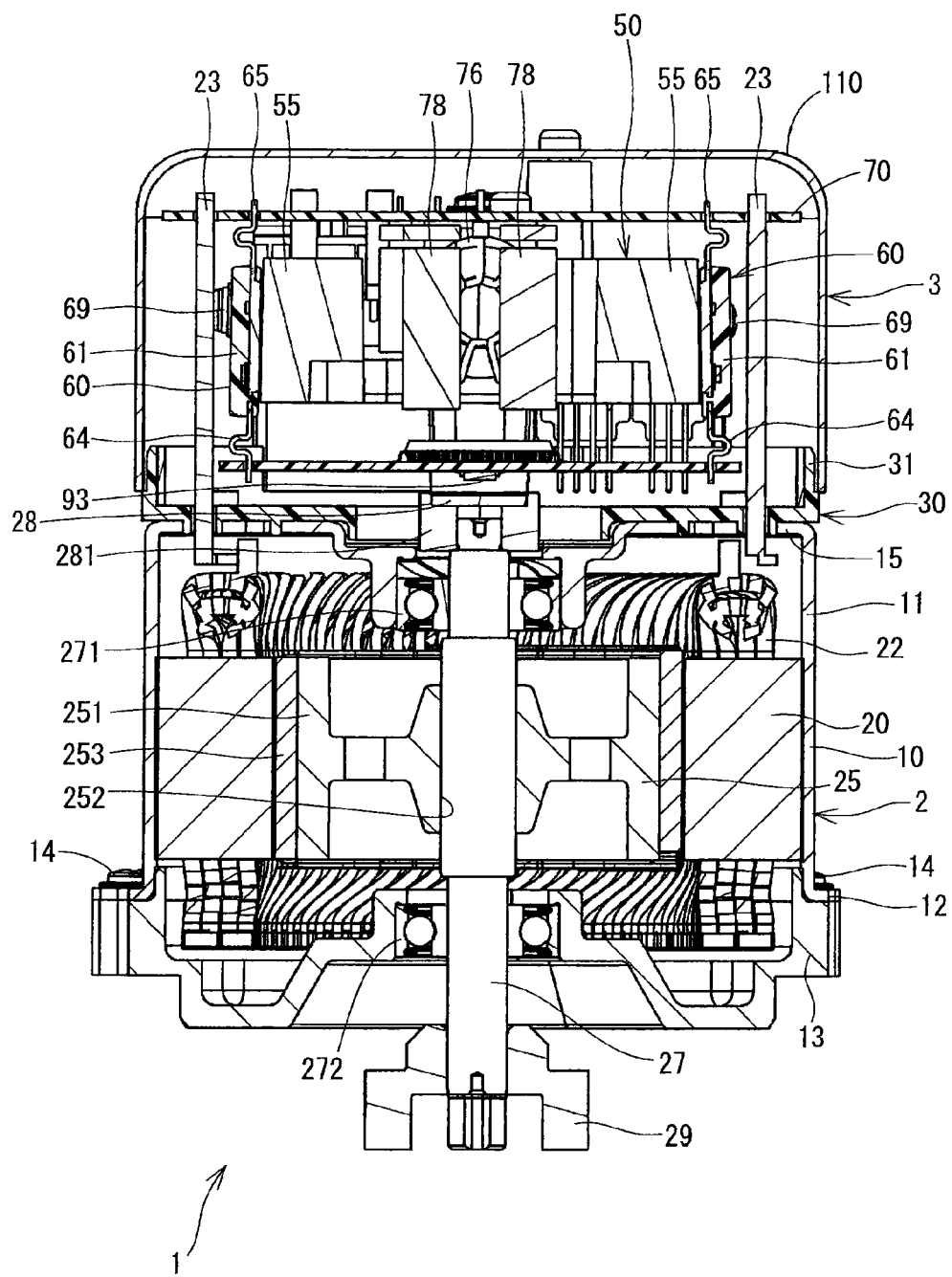
FIG. 4 is a cross-sectional view illustrating the drive device.
Figure 5:
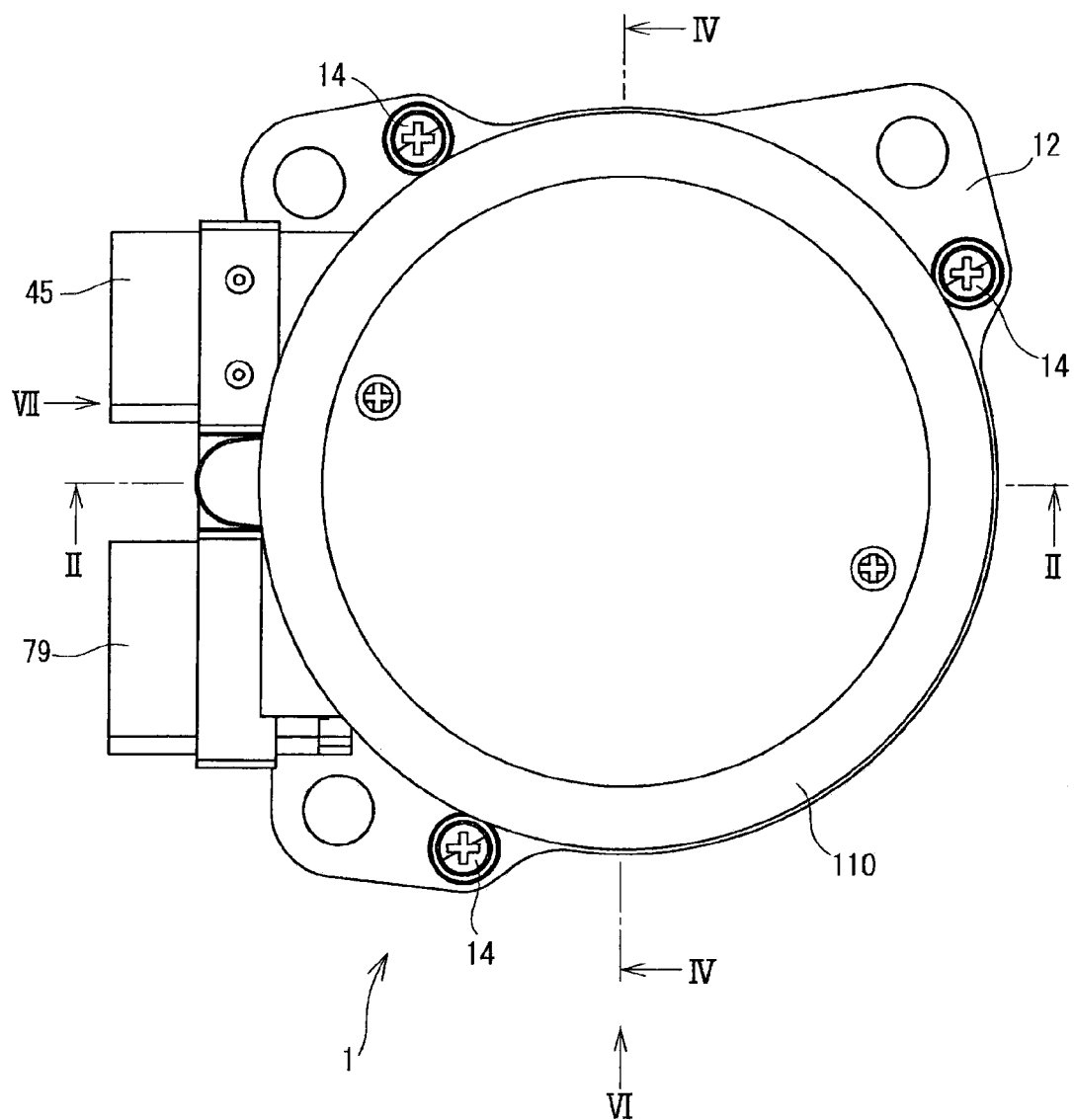
FIG. 5 is a plan view illustrating the drive device.
Figure 6:
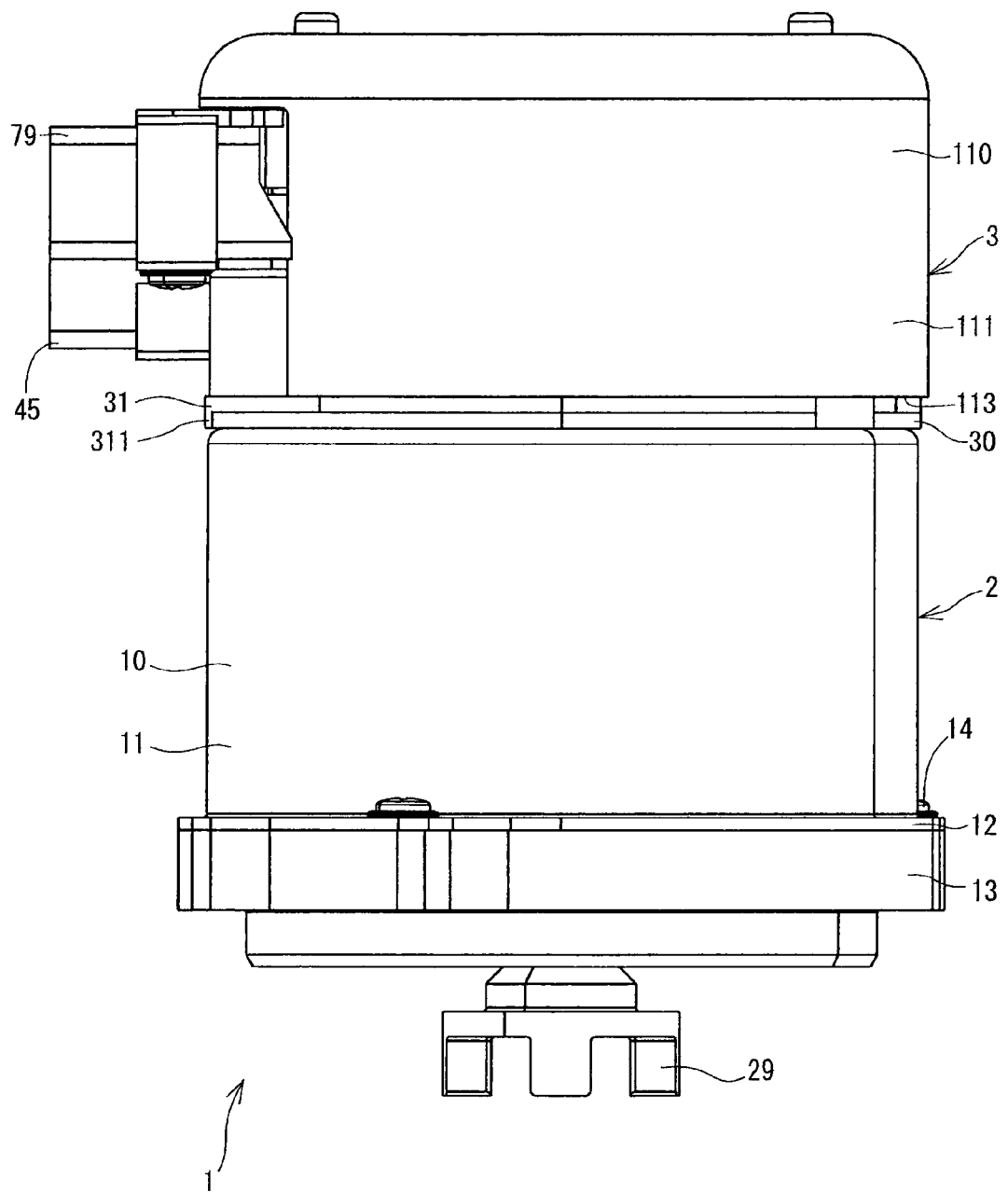
FIG. 6 is a side view seen in a direction of VI in FIG. 5.
Figure 7:
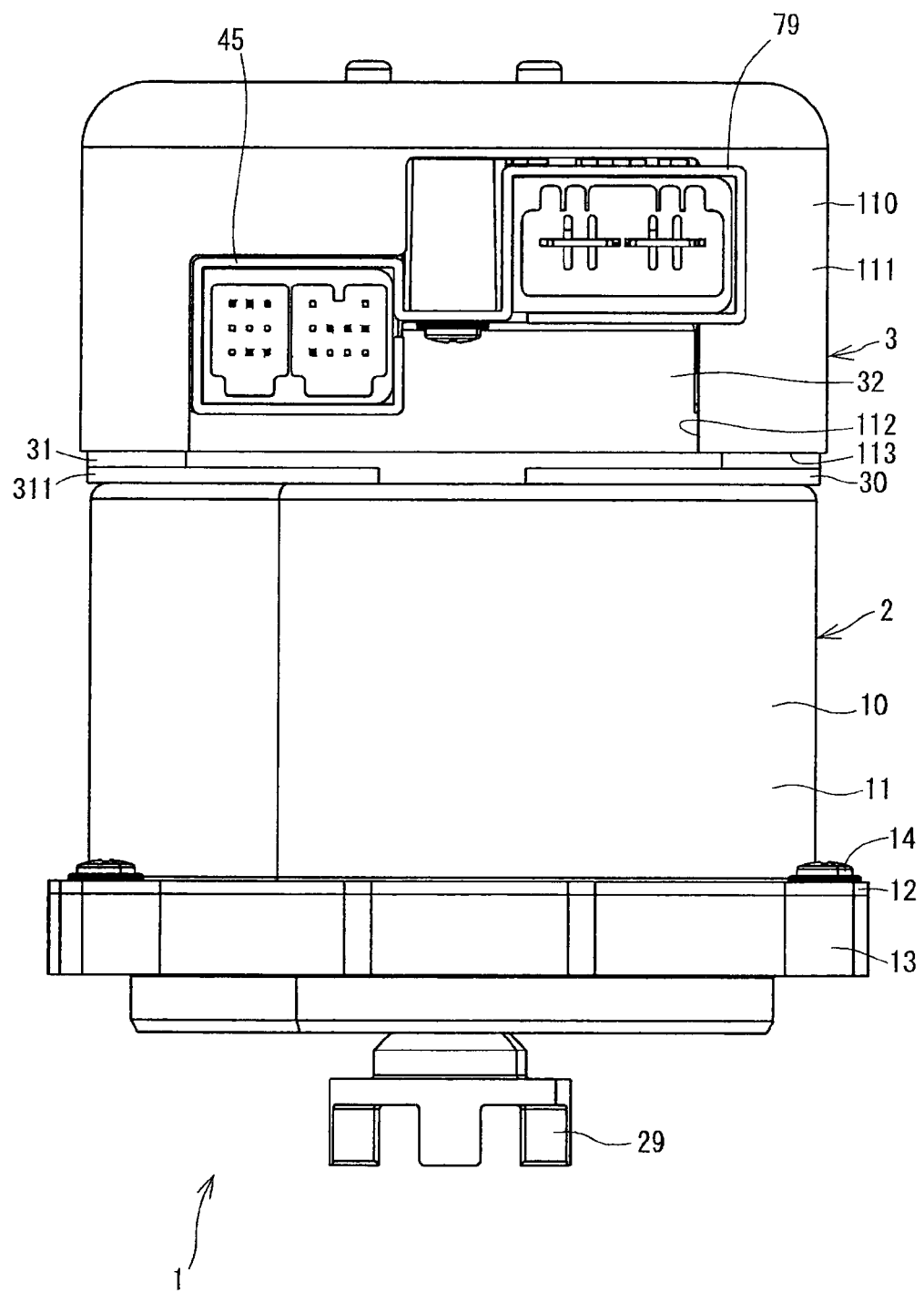
FIG. 7 is a side view seen in a direction of VII in FIG. 5.
Figure 8:
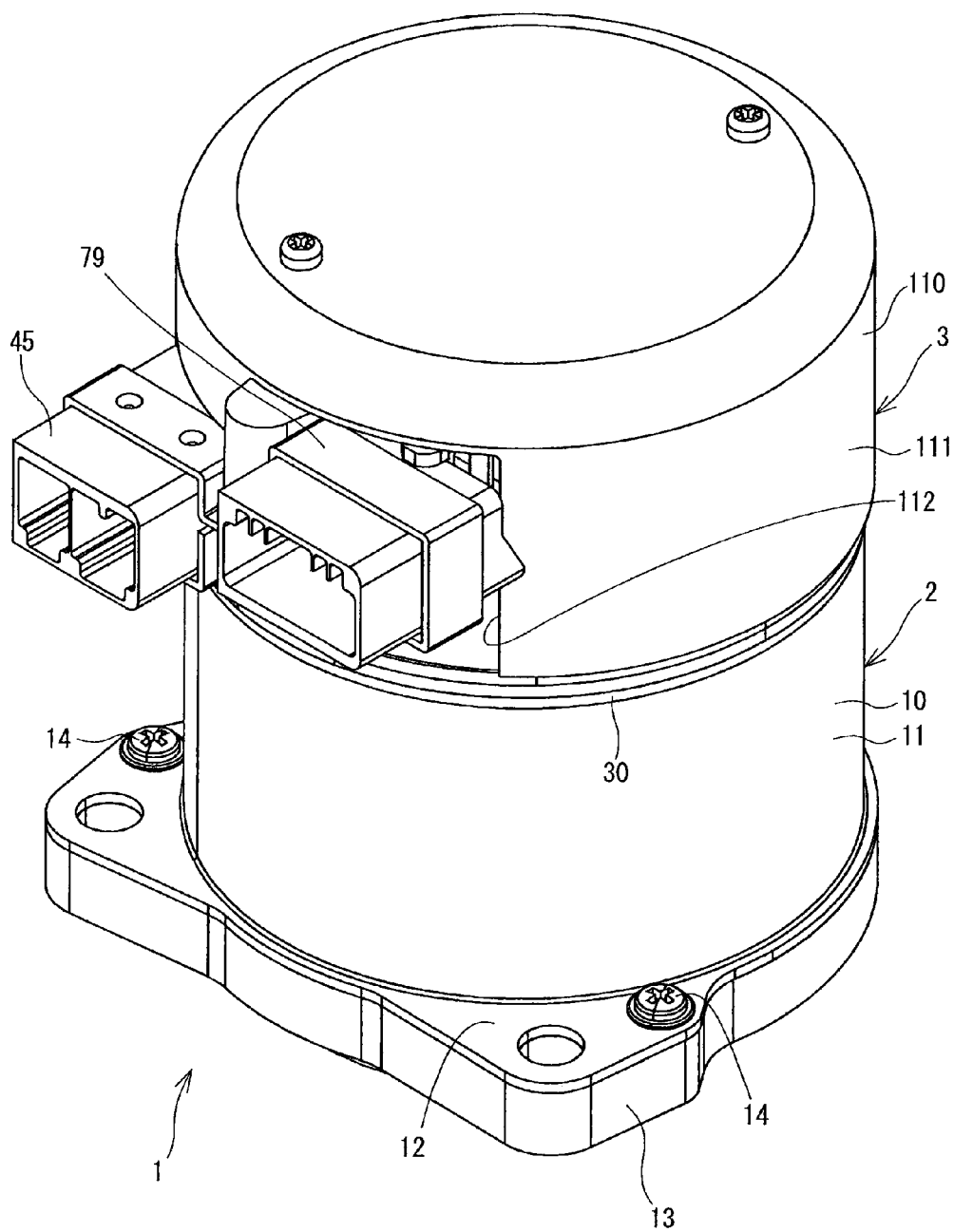
FIG. 8 is a perspective view illustrating the drive device.
Figure 11:
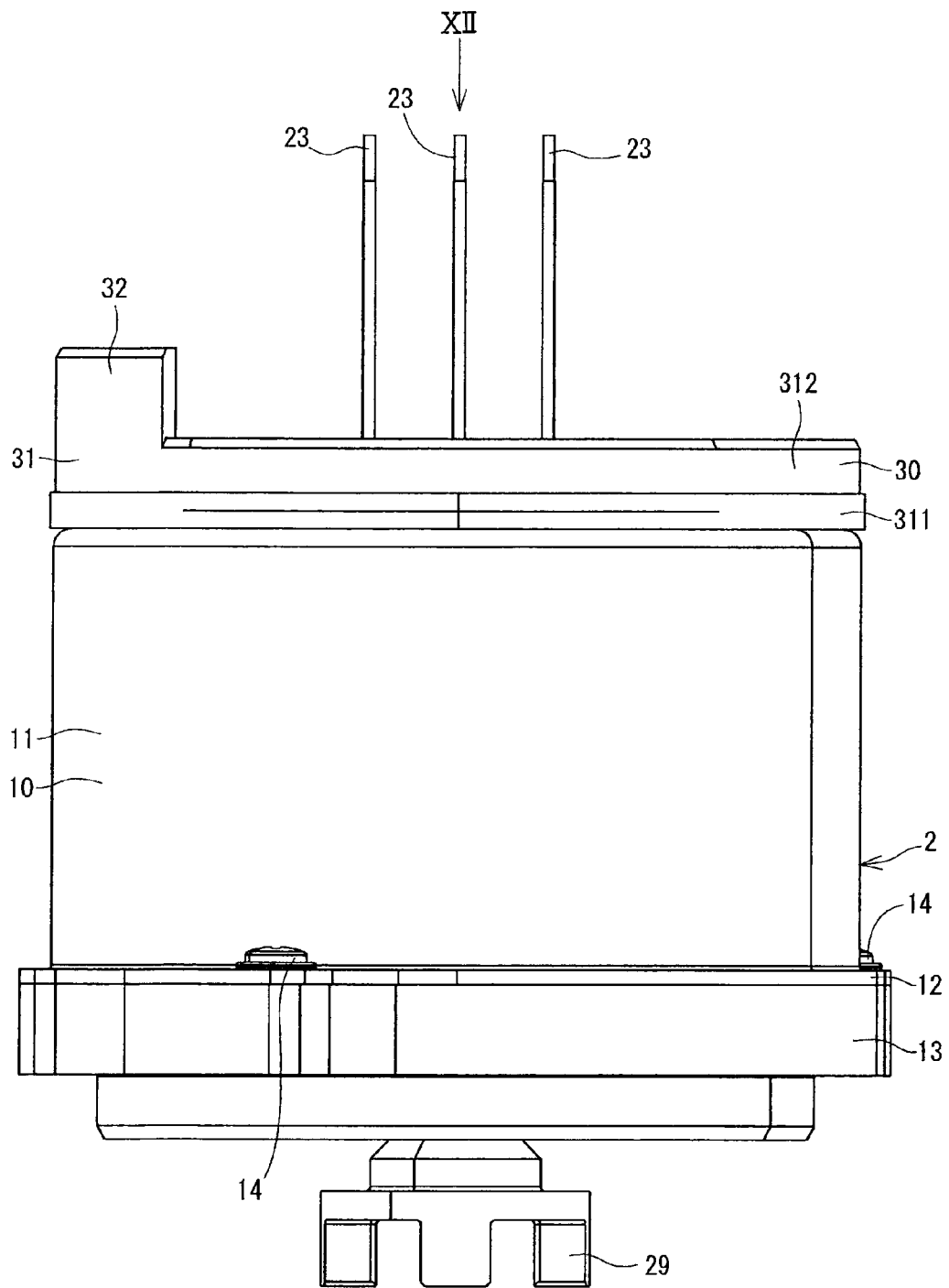
FIG. 11 is a side view illustrating a motor and a holder of the drive device.
Figure 12:
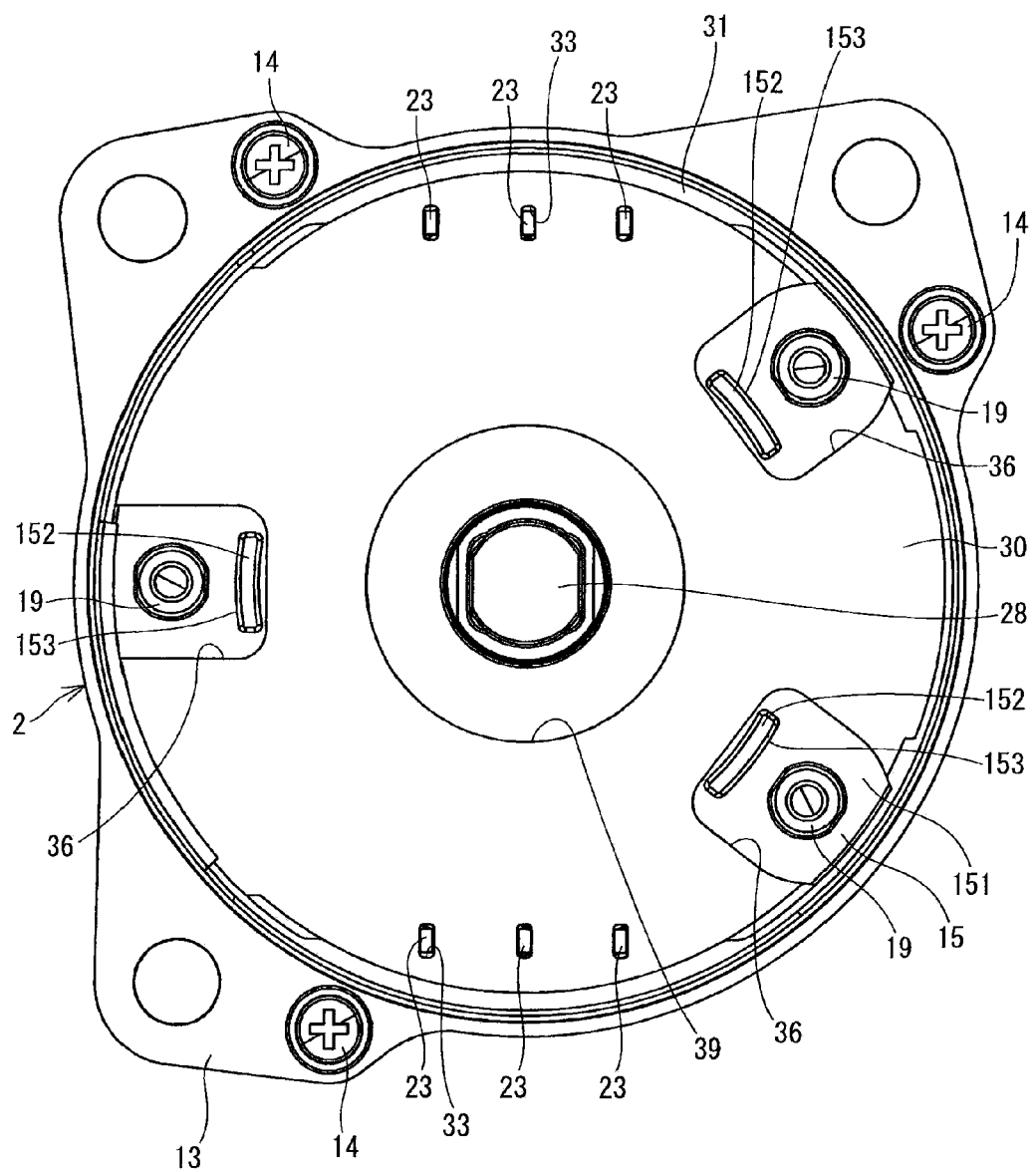
FIG. 12 is a plan view seen in a direction of XII in FIG. 11.
Figure 13:
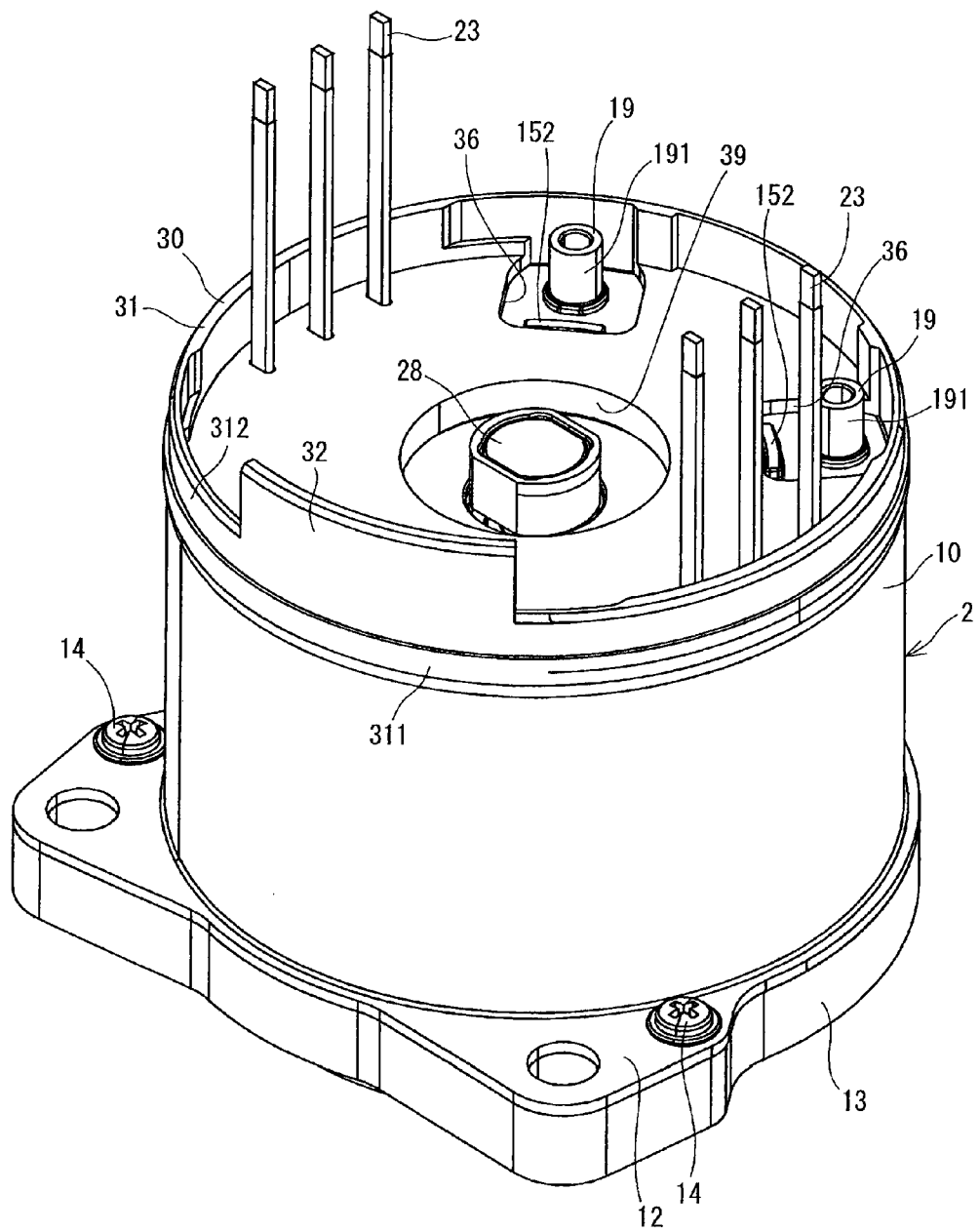
FIG. 13 is a perspective view illustrating the motor and the holder of the drive device.
Figure 14:
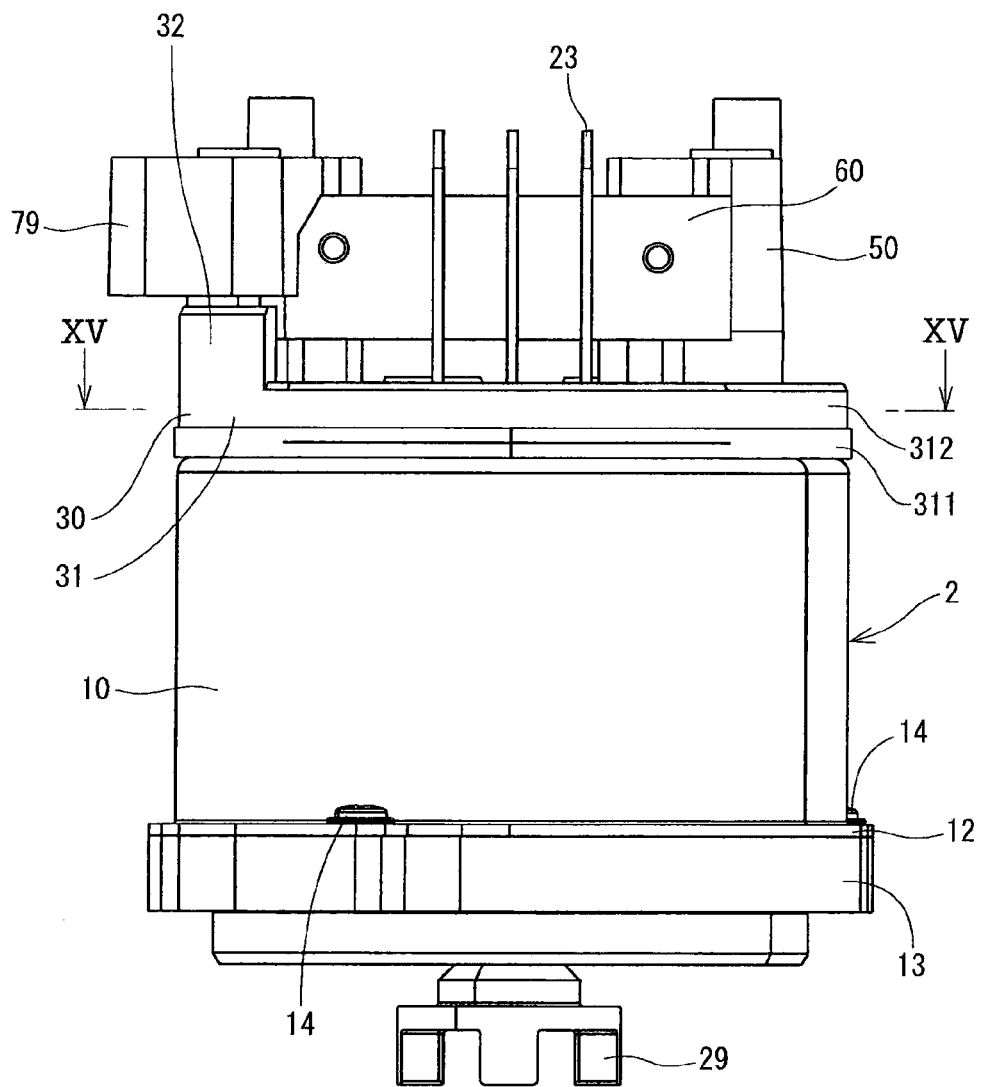
FIG. 14 is a side view illustrating a heat sink and a power module assembled to the motor.
Figure 15:
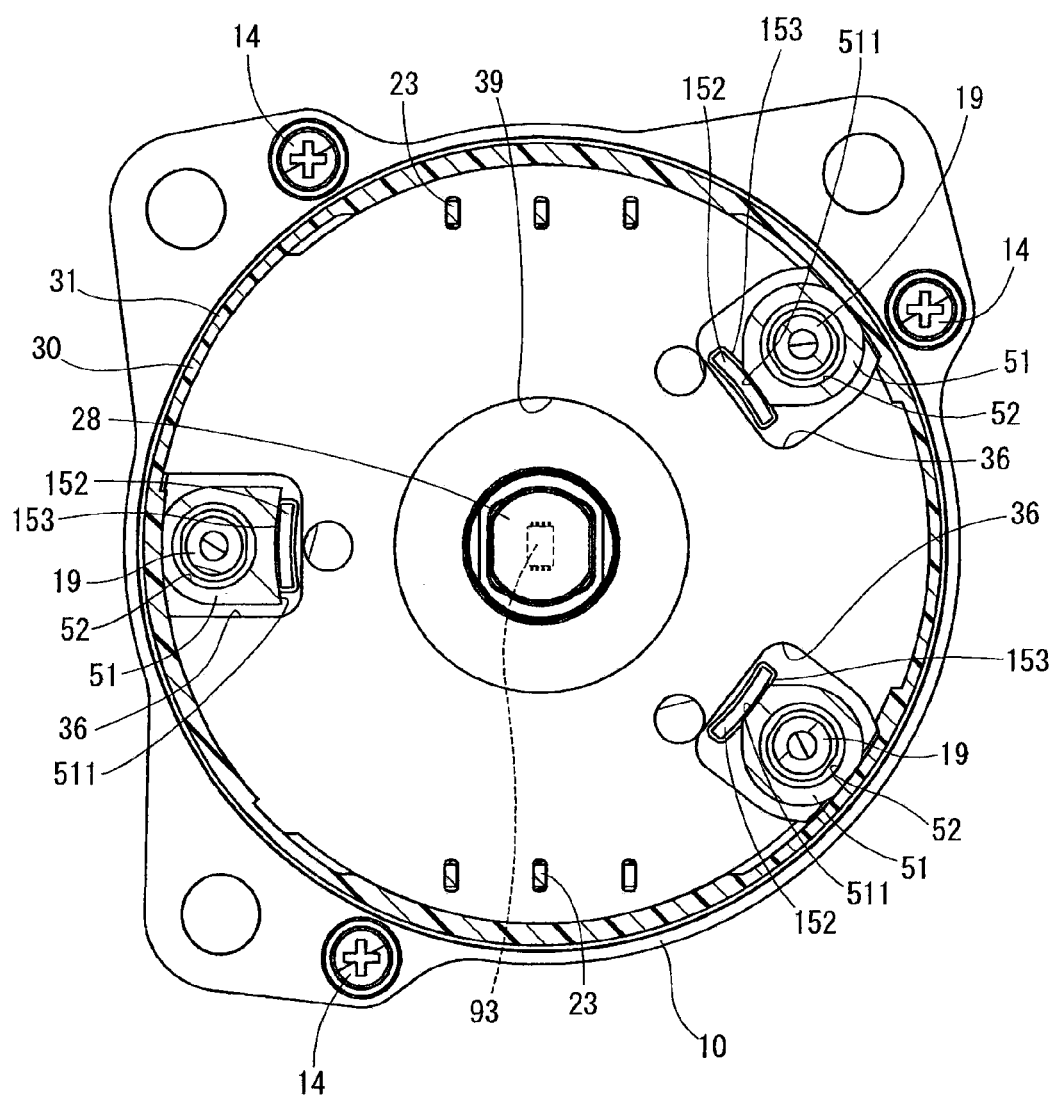
FIG. 15 is a cross-sectional view taken along line XV-XV in FIG. 14.
Figure 16:
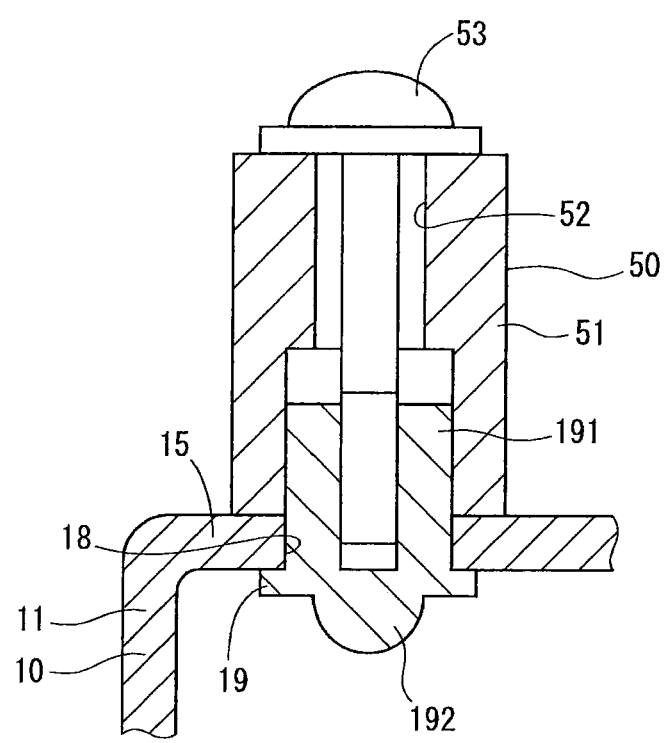
FIG. 16 is a schematic cross-sectional view illustrating a column and a through bolt of the drive device.
Figure 17:
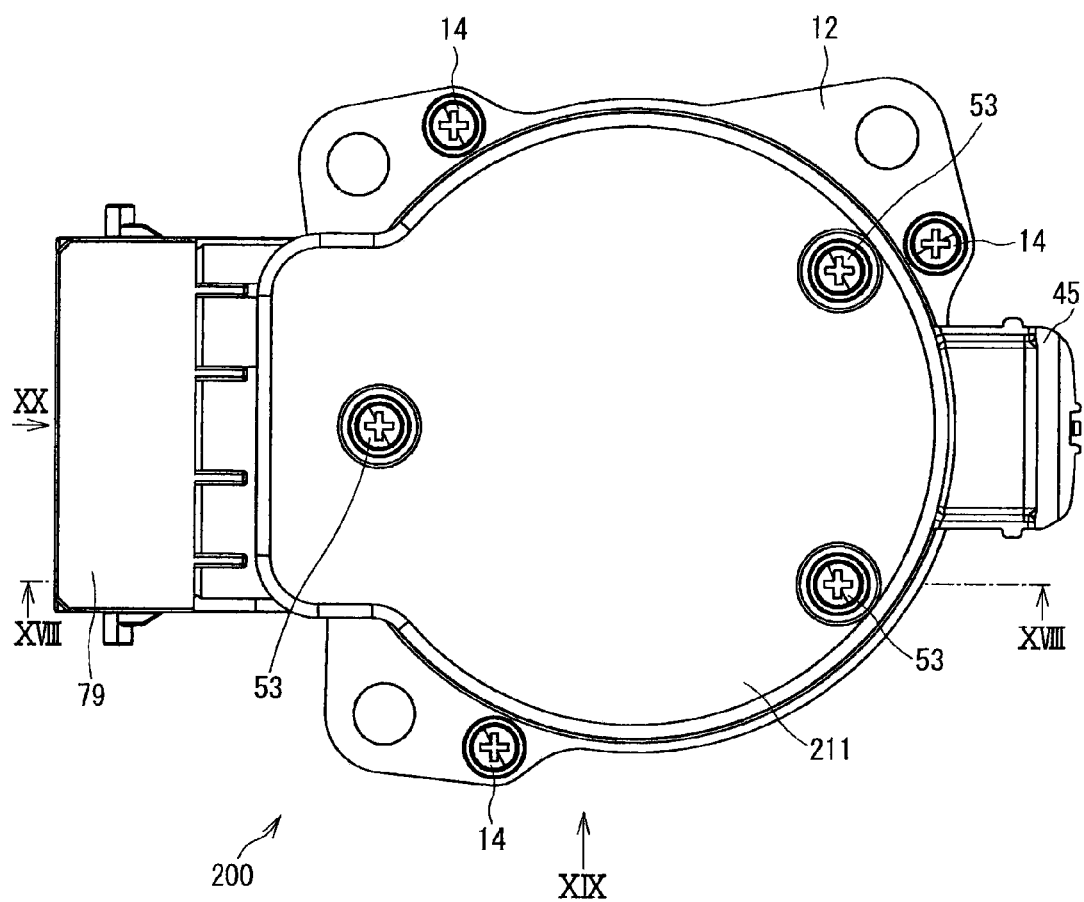
FIG. 17 is a plan view illustrating a drive device according to a second embodiment.

A construction of the drive device 1 will be described with reference to FIGS. 2-16. FIGS. 2, 5-10 are views illustrating the whole of the drive device 1. FIGS. 11-13 are views illustrating the holder 30 attached to the motor 2. FIGS. 14 and 15 are views illustrating the holder 30, the heat sink 50 and the power module 60 attached to the motor 2. FIG. 2 is a cross-sectional view taken along a line II-II in FIG. 5. FIG. 4 is a cross-sectional view taken along a line IV-IV in FIG. 5. FIG. 3 is an enlarged view of the section III of FIG. 2. FIG. 16 is a schematic cross-sectional view illustrating the column 19 corresponding to a first fastener and the through bolt 53 corresponding to a second fastener.

As shown in FIG. 2, the control unit 3 is arranged on an end of the motor 2 in the axis direction of the motor 2. The motor 2 and the control unit 3 have stack (layer) structure.

The motor 2 is explained based on FIGS. 2 and 4. The motor 2 has a motor case 10, a stator 20 around which a winding wire 22 is wound, a rotor 25, and a shaft 27.

The motor case 10 forms an outer shape of the motor 2, and has a peripheral wall 11 and a unit-side wall part 15 opposing to the control unit 3. The case 10 is shaped in a based cylinder, and is made of iron, for example. A flange 12 is arranged on an end of the peripheral wall 11 opposite from the unit-side wall part 15. A flame end 13 made of aluminum, for example, is fixed to the peripheral wall 11 through the flange 12 with a screw 14. A column 19 is arranged to the wall part 15, and the motor 2 and the control unit 3 are directly connected with each other through the column 19.

The stator 20 is arranged inside the motor case 10. The stator 20 has sixty poles projected inward in the radial direction. The pole has a layer-built iron core which is produced by layering thin boards made of magnetic material, and an insulator which fits to outside of the iron core in an axis direction of the iron core. The winding wire 22 is wound around the insulator.

The number of the thin boards may be changed based on output required for the motor 2. That is, the output of the motor 2 is changeable without changing the dimension in the radial direction, by changing the number of the thin boards, that is, by changing the dimension in the axis direction only. The drive device 1 can be mounted in a limited space whose dimension in the radial direction is relatively small.

Figure 9:
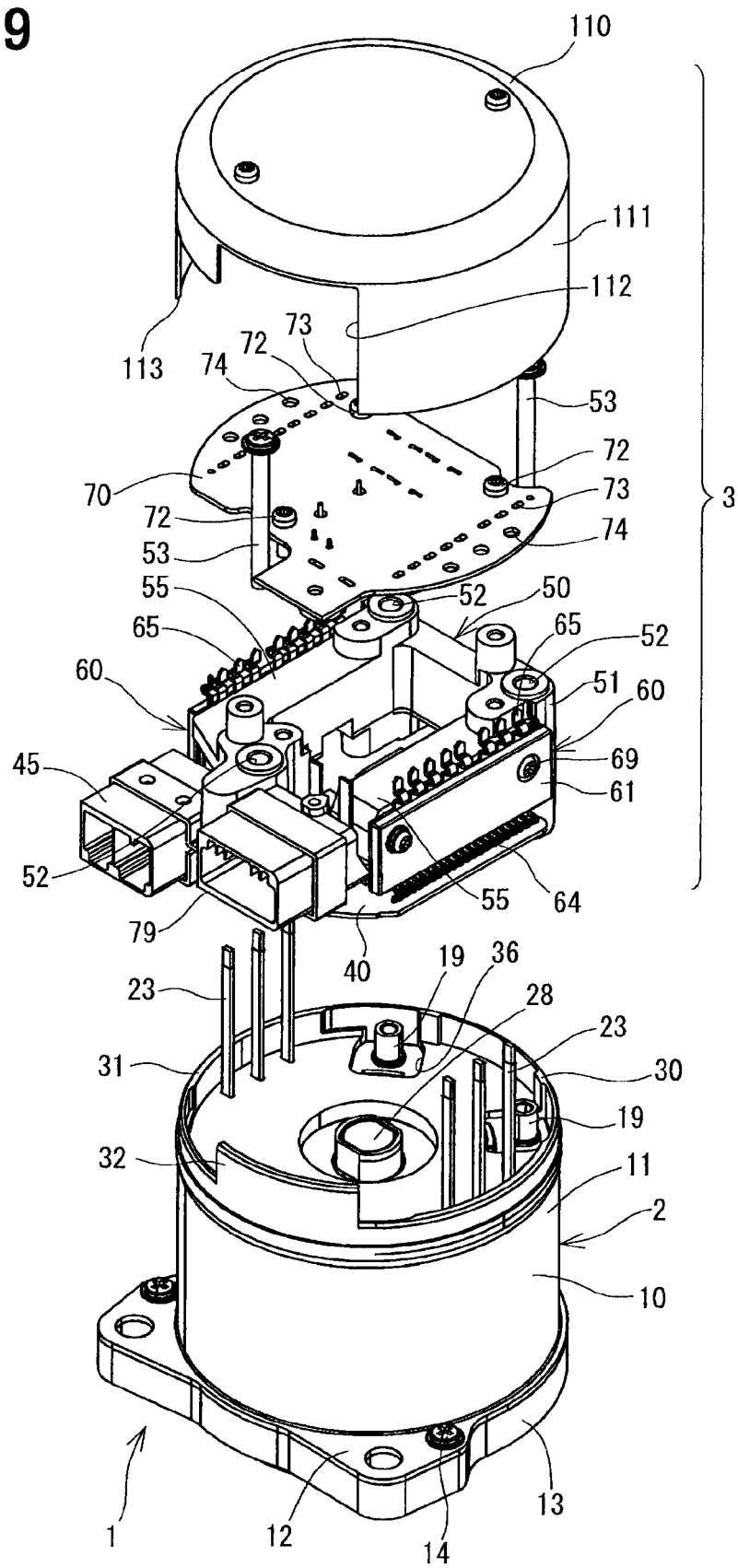
FIG. 9 is an exploded perspective view illustrating the drive device.

The winding wire 22 constructs a three phase winding wire which consists of the U phase coil, the V phase coil, and the W phase coil. As shown in FIG. 9, six wires 23 are taken out from the winding wire 22. The taken-out wire 23 extends toward the control unit 3 from a hole 17 defined in the unit-side wall part 15 of the motor case 10, as shown in FIG. 3. The wire 23 taken out toward the control unit 3 extends in outer side of a control board 40 and a power module 60 in the radial direction, and is connected to a power board 70. That is, when seen in the axis direction of the motor 2, the taken-out wire 23 is located on the outer side of the power module 60 in the radial direction. Moreover, the taken-out wire 23 is extended to the power board 70 by striding the power module 60 on the outer side area of the power module 60 in the radial direction.

The rotor 25 is arranged in the stator 20 in the radial direction, and is rotatable with respective to the stator 20. The rotor 25 has a cylindrical shape, and is made of magnetic material such as iron. The rotor 25 has a rotor core 251 and a permanent magnet 253 arranged outside of the rotor core 251 in the radial direction. The permanent magnet 253 alternately has N-poles and S-poles.

The shaft 27 is fixed in a shaft hole 252 defined in axial center of the rotor core 251. The shaft 27 is rotatably supported by a bearing 271 of the motor case 10 and a bearing 272 of the flame end 13. Thereby, the shaft 27 can rotate with the rotor 25 relative to the stator 20. An end portion of the shaft 27 adjacent to the control unit 3 passes through a shaft hole 16 (FIG. 3) defined in axial center of the wall part 15 of the motor case 10. Thereby, the end portion of the shaft 27 is exposed from the motor case 10 toward the control unit 3. The shaft hole 16 has a diameter larger than the outer diameter of the shaft 27, and the motor case 10 does not regulate the rotation of the shaft 27.

The end portion of the shaft 27 has a magnet 28 integrally rotating with the shaft 27. The magnet 28 is an object to be detected, and is coaxially fixed to a magnet holder 281 arranged on the end portion of the shaft 27, and is exposed to the control unit 3. The shaft 27 does not penetrate the control board 40, and the magnet 28 is arranged near a face of the control board 40 opposing to the motor 2.

The shaft 27 has an output end 29 at the end opposite from the control unit 3. A gear box (not shown) having the gear 7 inside is arranged at the end of the shaft 27 opposite from the control unit 3. The gear 7 is connected with the output end 29, and is rotated by the rotation of the shaft 27.

Next, the control unit 3 is explained based on FIGS. 2-10. The control unit 3 has the control board 40, the heat sink 50 corresponding to a receiving member, the power module 60 corresponding to a semiconductor module, the power board 70, and a cover 110.

A motor case region is defined by projecting the motor case 10 in the axis direction. Approximately most of the construction of the control unit 3 except a connector 45 and a connector 79 (FIG. 5) used for connection with external electronic components is included in the motor case region.

Figure 10:
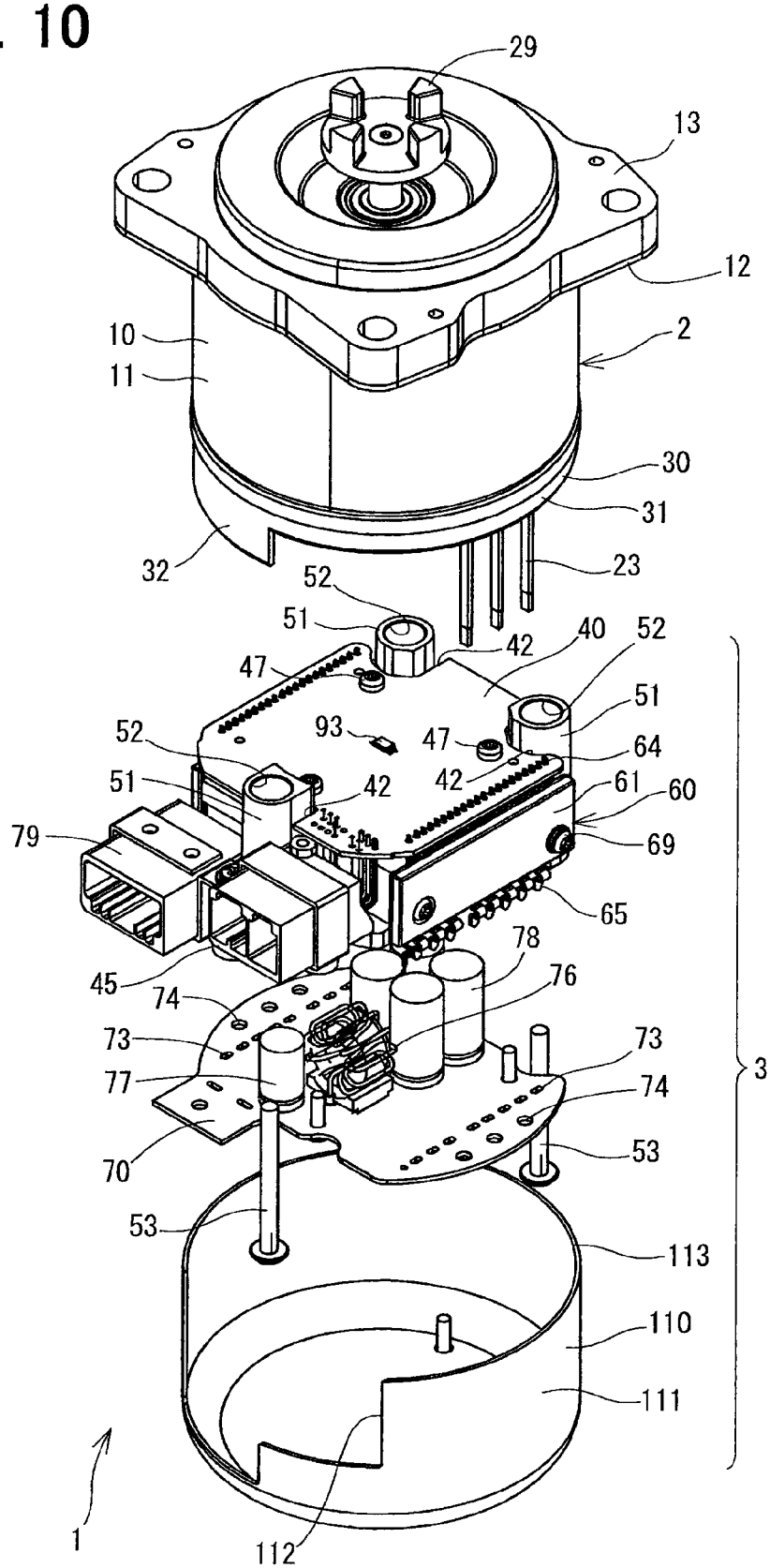
FIG. 10 is an exploded perspective view illustrating the drive device.

As shown in FIGS. 9 and 10, the control board 40, the heat sink 50 and the power module 60, and the power board 70 are arranged in this order from the side of the motor 2 in the axis direction. That is, the motor case 10, the control board 40, the heat sink 50 and the power module 60, and the power board 70 are arranged in this order in the axis direction.

The control board 40 is a four-layer board made of glass epoxy board, for example, and is accommodated in the motor case region. The control board 40 has three cutouts 42 at positions corresponding to the leg 51 of the heat sink 50 for an assembling time when the heat sink 50 is assembled to the motor case 10. The control board 40 is connected to the heat sink 50 from the side of the motor 2 using a screw 47, for example.

Several kinds of electronic components which construct the control 90 are mounted to the control board 40. The pre-driver 91, the custom IC 92, and the microcomputer 94 (which are shown in FIG. 1) are mounted on a face of the control board 40 opposite from the motor 2. The rotation angle sensor 93 is mounted on a face of the control board 40 opposing to the motor 2. The rotation angle sensor 93 is located at a position opposing to the magnet 28. The magnet 28 and the rotation angle sensor 93 are coaxially arranged on the rotation center of the shaft 27. The rotation angle sensor 93 detects a variation in magnetic field that is generated by the rotation of the magnet 28, thereby detecting the rotation angle of the shaft 27.

Holes used for connecting with a control terminal 64 of the power module 60 are defined along outer periphery of the control board 40. A control connector 45 is connected to the control board 40. The control connector 45 is located in a manner that the wiring extending from the motor 2 is connectable to the connector 45 in the axis direction. Signals are input into the connector 45 from the torque sensor 8 or the CAN.

The heat sink 50 is made of a material having high thermal conductivity, such as aluminum. The heat sink 50 has the leg 51 in the periphery of the heat sink 50, and contacts the unit-side wall part 15 of the motor case 10. For example, the leg 51 is arranged at three positions corresponding to the column 19. The leg 51 has an approximately cylindrical shape, and extends approximately perpendicular to the wall part 15 of the motor case 10. The leg 51 has a through hole 52 extending in the axis direction.

The heat sink 50 has a heat receiver 55 with a wide face that opposes to the taken-out wire 23. The heat receiver 55 extends upward in a direction from the unit-side wall part 15 of the motor case 10, and is approximately perpendicular to the wall part 15. Two of the heat receivers 55 are arranged parallel with each other, and the power module 60 is arranged along each of the heat receivers 55.

The power module 60 is vertically arranged outside of the heat sink 50 in the radial direction of the motor 2. A heat radiation sheet (not shown) is disposed between the power module 60 and the heat sink 50. The power module 60 and the radiation sheet are mounted to the heat sink 50 using a screw 69, for example, so that the heat sink 50 holds the power module 60 and the radiation sheet. Thereby, the power module 60 is held by the heat sink 50 through the radiation sheet. Heat generated by electricity supply is radiated to the heat sink 50 through the radiation sheet.

A wiring pattern (not shown) corresponding to a metal radiator is arranged on a face of the power module 60 opposing to the heat sink 50, and is partially exposed from a mold part 61 of the power module 60. The metal radiator contacts the heat receiver 55 of the heat sink 50 through the radiation sheet, so that heat can be radiated efficiently. The radiation sheet transmits heat from the power module 60 to the heat sink 50, and secures insulation between the power module 60 and the heat sink 50. That is, the radiation sheet works as an insulation member other than the heat radiator.

The power module 60 has the MOS 81-86 (refer to FIG. 1) which is a switching element switching power supply for the winding wire. The power module 60 has a wiring pattern made with copper, and the MOS 81-88 and the shunt resistor 99 are arranged on the power module 60. The wiring pattern is electrically connected to the MOS 81-88 with a wire, for example, and is molded by a mold part 61.

A relationship between the circuit construction shown in FIG. 1 and the power module 60 will be described below. One of the power modules 60 corresponds to the first inverter 80, and has the MOS 81-86, the power relay 87, 88, and the shunt resistor 99 shown in FIG. 1. Resin mold is integrally performed for the MOS 81-86, the power relay 87, 88, and the shunt resistor 99 as one module.

Moreover, the other power module 60 corresponds to the second inverter 89, and has the MOS, the power relay, and the shunt resistor which construct the second inverter 89. That is, one power module corresponds to one inverter circuit in this embodiment. In other word, one power module which constructs one drive system is arranged to correspond to one heat receiver.

The power module 60 has a control terminal 64 and a power terminal 65 which are projected from the mold part 61. The control terminal 64 is formed on a face of the module 60 that is approximately vertical to the longitudinal direction of the wide face of the mold part 61. The power terminal 65 is formed on a face parallel to the face having the control terminal 64.

The power module 60 is vertically arranged along the heat receiver 55 of the heat sink 50, so that the control terminal 64 is located to oppose the control board 40 and that the power terminal 65 is located to oppose the power board 70. That is, the control terminal 64 is arranged to protrude to the control board 40, and the power terminal 65 is arranged to protrude to the power board 70.

The control terminal 64 is inserted into a hole defined in the control board 40, and is electrically connected with the control board 40 by solder, for example. A control signal is output from the control board 40 to the power module 60 through the control terminal 64.

The power terminal 65 is inserted into a through hole 73 defined in the power board 70, and is electrically connected with the power board 70 by solder, for example. Winding current supplied to the winding wire 22 is transmitted to the power module 60 via the power terminal 65.

Only a small electric current (for example, 200 mA) is supplied to the control board 40, that is enough for the drive control of the motor 2, in the present embodiment. In contrast, a large amount of electric current (for example, 80 A) is supplied to the power board 70, and is used for driving the motor 2. Therefore, the power terminal 65 is thicker than the control terminal 64.

The power board 70 is a four-layer board made with a glass epoxy board, and has thick pattern made of copper foil, for example. The power board 70 has a board shape settled in the motor case region, and is mounted to the heat sink 50 from the opposite side of the motor 2 using a screw 72, for example. The power board 70 has a power wiring to which the winding current is supplied through the winding wire 22.

The power board 70 has the hole 73, and the power terminal 65 of the power module 60 passes through the hole 73. As shown in FIG. 9, a hole 74 is formed on the outer side of the through hole 73 in the radial direction, and the taken-out wire 23 passes through the hole 74. The wire 23 is inserted into the hole 74, and is electrically connected with the power board 70 by solder, for example. Thereby, the wire 23 is connected with the power module 60 through the power board 70.

As shown in FIG. 2, the choking coil 76 and the capacitor 77, 78 are mounted on a face of the power board 70 opposing to the motor 2. The choking coil 76 and the capacitor 77, 78 are arranged in a space defined inside the heat sink 50. The choking coil 76, the capacitor 77, 78 and the power connector 79 are located between the power board 70 and the control board 40 in the axis direction.

The choking coil 76 has a cylindrical shape, and the length of the coil 76 in the axis direction is smaller than the length of the coil 76 in the radial direction. The choking coil 76 is arranged at a position not overlapping with the shaft 27 when seen from the axis direction of the motor 2. The axis of the choking coil 76 is approximately perpendicular to the center line of the shaft 27, that is, the coil 76 is arranged to extend vertically.

The capacitor 77, 78 is an aluminum electrolytic capacitor. The number of the capacitors 78 is four, and the capacitor 78 has a capacitance larger than that of the capacitor 77. The capacitor 77, 78 may be other capacitor other than the aluminum electrolytic capacitor depending on its capacitance.

Moreover, the power connector 79 is connected to the power board 70, and is located adjacent to the control connector 45 on the same side. The power connector 79 is arranged to be connectable to a wiring from outside of the motor 2 in the radial direction, and is connected with the power source 75. Electric power is supplied to the power board 70 from the power source 75 via the power connector 79. Moreover, the electric power supplied from the power source 75 is supplied to the winding wire 22 wound around the stator 20 via the power connector 79, the power board 70, the power module 60, and the taken-out wire 23.

The cover 110 is made of metal material such as iron, and prevents the electric field and the magnetic field from leaking from the control unit 3 to outside. Further, the cover 110 prevents dust from entering inside the control unit 3. The cover 110 has a diameter approximately the same as the motor case 10, and has a based cylinder shape open to the motor 2.

The peripheral wall 111 has a cutout 112 at a position corresponding to the control connector 45 and the power connector 79. The cutout 112 is shaped to correspond to the shapes of the control connector 45 and the power connector 79. Because the control connector 45 is located closer to the motor 2 than the power connector 79 in the axis direction, the cutout 112 is defined by forming a step. The control connector 45 and the power connector 79 are exposed from the cutout 112 in the radial direction, and connected to external electronic components such as the power source 75 outside of the drive device 1.

The holder 30 is arranged between the motor 2 and the control unit 3. The holder 30 has an approximately disc shape having a diameter approximately the same as the motor case 10. The holder 30 is made of resin, for example.

The holder 30 has a wall part 31 extending toward the control unit 3, and the wall part 31 is formed around all the outer periphery of the holder 30. As shown in FIG. 13, the wall part 31 has a first wall 311 and a second wall 312. The first wall 311 extends along the outer periphery. The second wall 312 is located between the first wall 311 and the control unit 3 in the axis direction, and is located on the inner side of the first wall 311 in the radial direction.

The second wall 312 is inserted to the inner side of the peripheral wall 111 of the cover 110 in the radial direction, and the holder 30 and the cover 110 fit with each other. A face of the step between the first wall 311 and the second wall 312 is contact with an end portion 113 of the peripheral wall 111 opposing to the motor 2, so that invasion of foreign matter from outside to the drive device 1 in the radial direction is reduced.

In the present embodiment, the power connector 79 is distanced from the control connector 45 in the axis direction toward the opposite side of the motor 2. Therefore, the wall part 31 of the holder 30 has a protrusion 32 protruding toward the control unit 3, and the protrusion 32 has a shape corresponding to the step between the control connector 45 and the power connector 79 opposing to the motor 2.

As shown in FIG. 12, a hole part 33 is defined in the holder 30 on the inner side of the wall part 31 in the radial direction. The hole part 33 is located on the outer side of the power module 60 of the control unit 3 in the radial direction. For example, as the hole part 33, two sets of three holes are defined to oppose with each other. The hole part 33 has a shape corresponding to the taken-out wire 23, and has an outer circumference slightly larger than that of the taken-out wire 23. The taken-out wire 23 is inserted into the hole of the hole part 33 one by one. Moreover, a fitting part (not shown) is defined at a position corresponding to the hole part 33, and is projected toward the motor 2. The fitting part is fitted with the taken-out part of the motor case 10.

Because the fitting part has a predetermined thickness in the axis direction, the positioning of the wire 23 is determined by being inserted into the hole part 33, and the taken-out wire 23 is held to extend in a predetermined direction. Further, because the holder 30 is made of resin, the insulation between the taken-out wires 23 and the insulation between the wire 23 and the motor case 10 are secured.

A cutout 36 is defined in the holder 30 at a position corresponding to the column 19 and the leg 51 of the heat sink 50, so that the holder 30 does not interfere with the connection between the column 19 and the bolt 53. Moreover, a shaft hole 39 is defined in the center of the holder 30, and the end portion of the shaft 27 opposing to the control unit 3 passes through the shaft hole 39.

As shown in FIGS. 2 and 12-16, the column 19 is arranged in the unit-side wall part 15 of the motor case 10. The column 19 is embedded and fixed to a column attachment hole 18 defined in the unit-side wall part 15 from the opposite side of the control unit 3. The column 19 is located on inner side of the peripheral wall 11 in the radial direction. Construction of the power module 60 such as terminal is omitted in FIG. 14.

As shown in FIG. 16, the column 19 is made of aluminum, for example, and has a cylindrical shape. The column 19 has an internal thread part 191 and a block part 192 corresponding to a closure part. An internal thread is defined on an inner face of the internal thread part 191 in the radial direction. The internal thread part 191 is inserted into the column attachment hole 18, and projects toward the control unit 3 from the cutout 36 of the holder 30. Further, the internal thread part 191 is inserted into the through hole 52 defined in the leg 51 of the heat sink 50.

The through bolt 53 is inserted into the through hole 52 from the opposite side of the motor case 10, and has a male thread on the end portion. The bolt 53 is tightened with the column 19 inside the through hole 52. Thereby, the unit-side wall part 15 of the motor case 10 and the heat sink 50 of the control unit 3 are directly connected on the inner side of the peripheral wall 11 in the radial direction. The block part 192 has a diameter larger than that of the column attachment hole 18, and is arranged in the motor case 10. The block part 192 closes the hole 18 on the opposite side of the control unit 3. Even if a foreign matter such as cut chip is generated when the through bolt 53 and the column 19 are connected with each other, the foreign matter cannot enter the motor case 10.

As shown in FIG. 12, a face 151 of the unit-side wall part 15 has a positioning part 152. For example, three of the positioning parts 152 are arranged on the inner side of the hole 18 in the radial direction. The positioning part 152 is a projection protruding toward the control unit 3.

The leg 51 of the heat sink 50 is fitted with a space between the column 19 and the positioning part 152. As shown in FIG. 15, a side face 511 of the leg 51 opposes to the positioning part 152, and is formed to contact a face 153 of the positioning part 152 opposing to the column 19 by a cut and shave process. The face 511 of the leg 51 and the face 153 of the positioning part 152 contact with each other, so that positioning can be relatively determined between the motor case 10 and the heat sink 50 in the radial direction. Thus, the motor 2 and the control unit 3 are coaxially arranged.

Operation of the drive device 1 will be described below. The microcomputer 94 disposed on the control board 40 generates pulse signal based on the signals output from the rotation angle sensor 93, the torque sensor 8, and the shunt resistor 99. The signal is modulated by a PWM control through the pre-driver 91 in a manner that the steering 5 is assisted according to the vehicle speed.

The pulse signal is output to the two inverters 80 and 89 constructed with the power module 60 via the control terminal 64, so as to control the switching of the MOS 81-86. Sinusoidal-wave currents having different phases are supplied to each phase of the winding wire 22, so that a rotating magnetic field is generated. Due to the rotating magnetic field, the rotor 25 and the shaft 27 are integrally rotated. When the shaft 27 is rotated, drive force is output to the gear 7 of the column shaft 6 from the output end 29, so that the steering 5 is assisted. That is, the motor 2 is driven by the winding current supplied to the winding wire 22. In this meaning, the winding current supplied to the winding wire 22 corresponds to a drive current which drives the motor 2.

Heat is generated when the MOS 81-88 of the power module 60 is switched, and the heat is radiated to the heat sink 50 through the radiation sheet. Therefore, failure and malfunction caused by a rise in temperature of the power module 60 are prevented. In addition, the size of the stator 20 or the rotor 25 may be changed according to the output demanded.

According to the first embodiment, the drive device 1 includes the motor 2, the control unit 3, the column 19 and the through bolt 53. The motor 2 has the motor case 10, the stator 20, the rotor 25 and the shaft 27. The motor case 10 has a cylindrical shape, and defines an outer shape of the motor 2. The stator 20 is arranged in the motor case in a radial direction, and a winding wire 22 is wound around the stator 20 so as to define plural phases. The rotor 25 is arranged in the stator 20 in the radial direction, and is rotatable relative to the stator 20. The shaft 27 is rotated with the rotor 25. The control unit 3 includes the power module 60 and the heat sink 50, and is arranged on a side of the motor 2 in the axis direction. The power module 60 has the MOS 81-86 which switches electricity supply to the winding wire 22. The heat sink 50 receives the power module 60. The column 19 is arranged in the wall part 15 of the motor case 10 opposing to the control unit 3, on an inner side of the peripheral wall 11 of the motor case 10 in the radial direction. The through bolt 53 is tightened with the column 19 so as to connect the motor 2 and the control unit 3 with each other.

The control unit 3 is arranged on the side of the motor 2 in the axis direction. The motor 2 and the control unit 3 are connected with each other by the tightening between the column 19 and the through bolt 53 that are located on the inner side of the motor case 10 in the radial direction. Thus, the size of the whole drive device 1 can be made smaller in the radial direction.

The positioning part 152 is arranged on the face 151 of the wall part 15 opposing to the control unit 3, and determines the positioning between the motor 2 and the control unit 3 in the radial direction. Therefore, the positioning of the motor 2 and the control unit 3 can be determined in the radial direction, so that axial deviation can be restricted from being generated between the motor 2 and the control unit 3.

The positioning part 152 has the shape fitting with the leg 51 of the heat sink 50. Therefore, the positioning of the motor 2 and the control unit 3 can be suitably determined in the radial direction The wall part 15 of the motor case 10 has the shaft hole 16, and the shaft 27 is exposed to the control unit 3 from the shaft hole 16. The end portion of the shaft 27 opposing to the control unit 3 has the magnet 28 rotating with the shaft 27. The control board 40 has the rotation angle sensor 93 arranged at the position opposing to the magnet 28, and the sensor 93 detects a rotation angle of the shaft 27. The sensor 93 detects the variation in the magnetic field generated by the rotation of the magnet 28, so that the rotation angle of the shaft 27 can be detected.

The magnet 28 and the sensor 93 are coaxially arranged, so that the rotation angle of the shaft 27 can be accurately detected by the sensor 93. Further, because the positioning part 152 and the leg 51 of the heat sink 50 are fitted with each other, the positioning can be determined between the motor 2 and the control unit 3 in the radial direction, so that the axial deviation can be reduced. Thus, the position deviation between the magnet 28 and the sensor 93 can be reduced, so that the rotation angle of the shaft 27 can be more accurately detected by the sensor 93.

The heat sink 50 has the leg 51 that contacts the wall part 15 of the motor case 10. The leg 51 has the through hole 52 passing through the axis direction of the motor 2, and the column 19 is inserted into the hole 52 from the side of the motor 2. Further, the through bolt 53 is inserted into the hole 52 from the opposite side of the motor 2. Thus, the heat sink 50 of the control unit 3 and the motor case 10 are directly connected with each other by the column 19 and the through bolt 53. Further, the column 19 and the bolt 53 are tightened inside of the hole 52, so that the whole size of the device 1 can be further made smaller.

The through bolt 53 has the male thread on the end portion. The column 19 is inserted into the column attachment hole 18 defined in the wall part 15 of the motor case 10, and has the internal thread part 191. The internal thread defined on the inner face of the internal thread part 191 is tightened with the male thread of the through bolt 53. Thereby, the motor 2 and the control unit 3 are easily connected with each other.

Further, the column 19 has the block part 192 that closes the hole 18 on the opposite side of the control unit 3. Even if a foreign matter such as cut chip is generated when the through bolt 53 and the column 19 are connected with each other, the foreign matter cannot enter the motor case 10, due to the block part 192.

(Second Embodiment)

Figure 18:
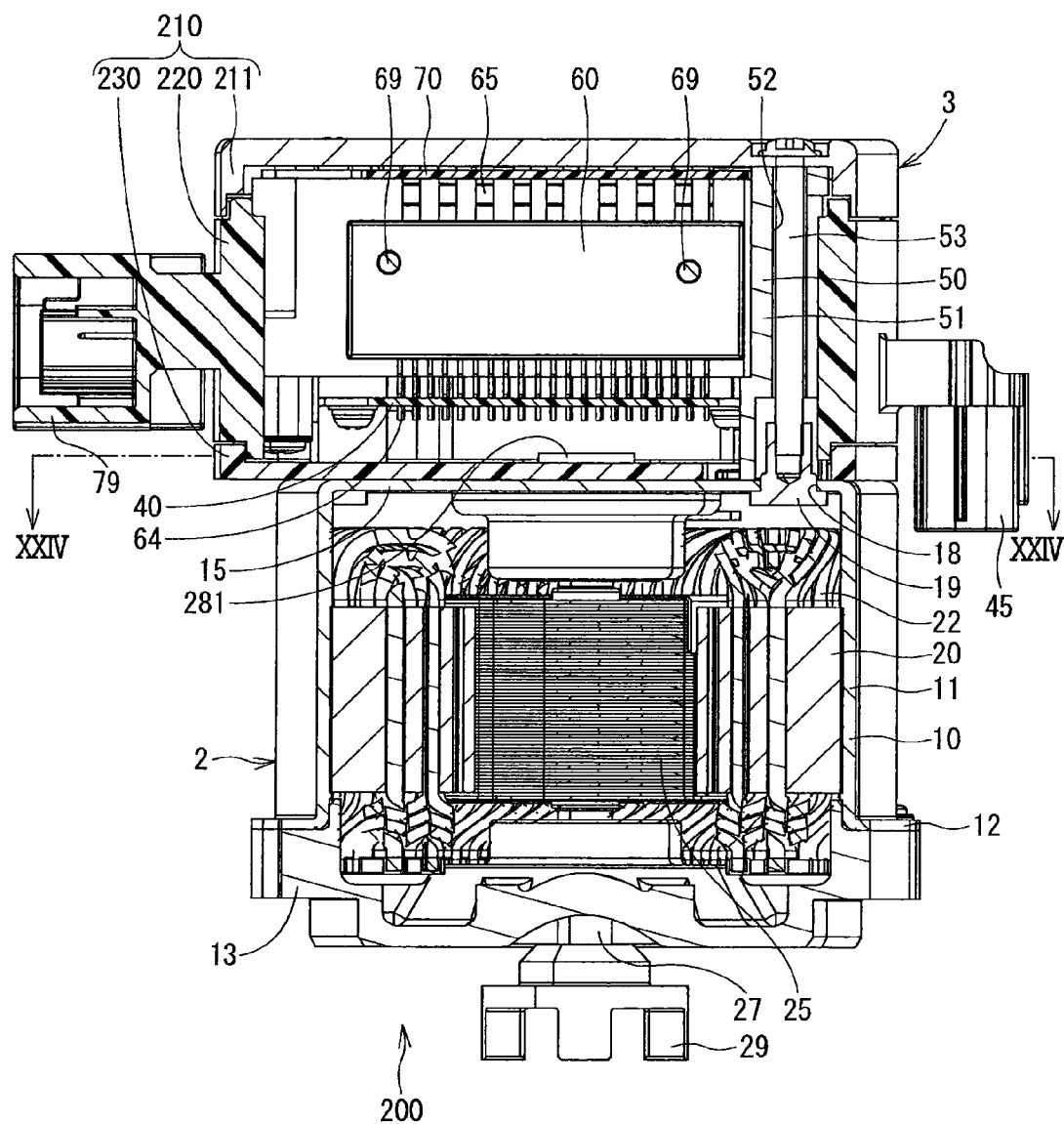
FIG. 18 is a cross-sectional view taken along line XVIII-XVIII in FIG. 17.
Figure 19:
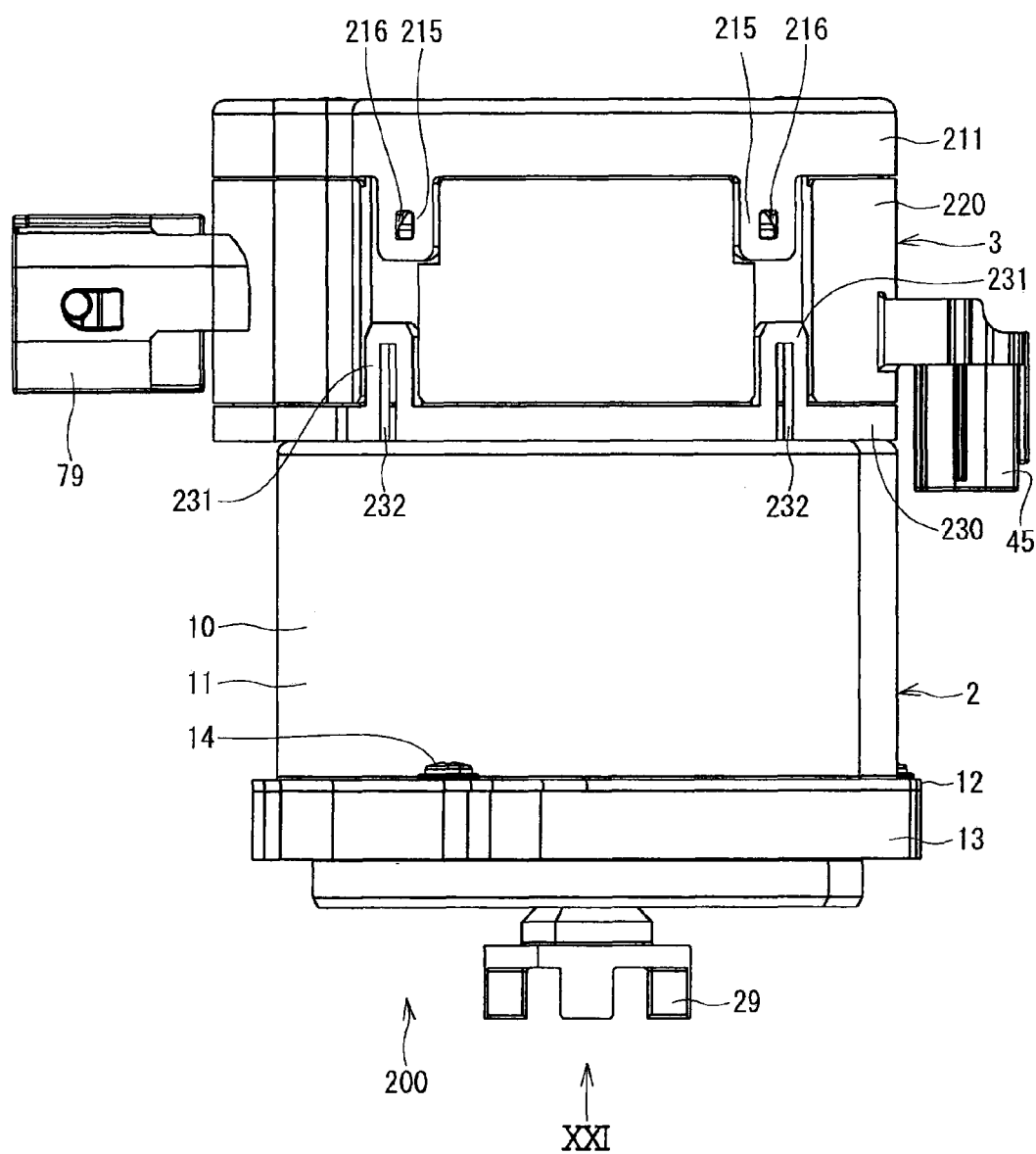
FIG. 19 is a side view seen in a direction of XIX in FIG. 17.

A second embodiment will be described with reference to FIGS. 17-24. FIGS. 17, 19-23 are views illustrating the whole of a drive device 200 according to the second embodiment. FIG. 18 is a cross-sectional view taken along a line XVIII-XVIII in FIG. 17. FIG. 24 is a cross-sectional view taken along a line XXIV-XXIV in FIG. 18.

The control device 3 of the drive device 200 has a cover 210 different from the cover 110 of the first embodiment.

The cover 210 has an end cover 211, a connector holder 220 and a holder 230. The cover 210 accommodates the control board 40, the heat sink 50 and the power module 60, and the power board 70 in the radial direction.

The end cover 211 is arranged at the end in the axis direction on the opposite side of the motor 2, and defines the outer shape opposite from the motor 2 in the axis direction. The end cover 211 has a based cylindrical shape made of metal material such as iron, and has a diameter approximately the same as the motor case 10. The end cover 211 has a screw hole 213 (FIG. 22) at a position corresponding to the through hole 52 defined in the leg 51 of the heat sink 50. The through bolt 53 is inserted into the screw hole 213 and the through hole 52 from the opposite side of the motor 2, and is tightened with the column 19 inside of the hole 52. That is, the bolt 53 is tightened with the column 19 through the end cover 211.

The through hole 52 is shaped into an approximately circle shape on the side of the end cover 211, and has an approximately C-shape cross-section open to the outer side in the radial direction on the side of the motor 2 (FIGS. 18 and 24). In other words, the leg 51 of the heat sink 50 has a cutout at the outer side in the radial direction on the side of the motor 2.

Figure 22:
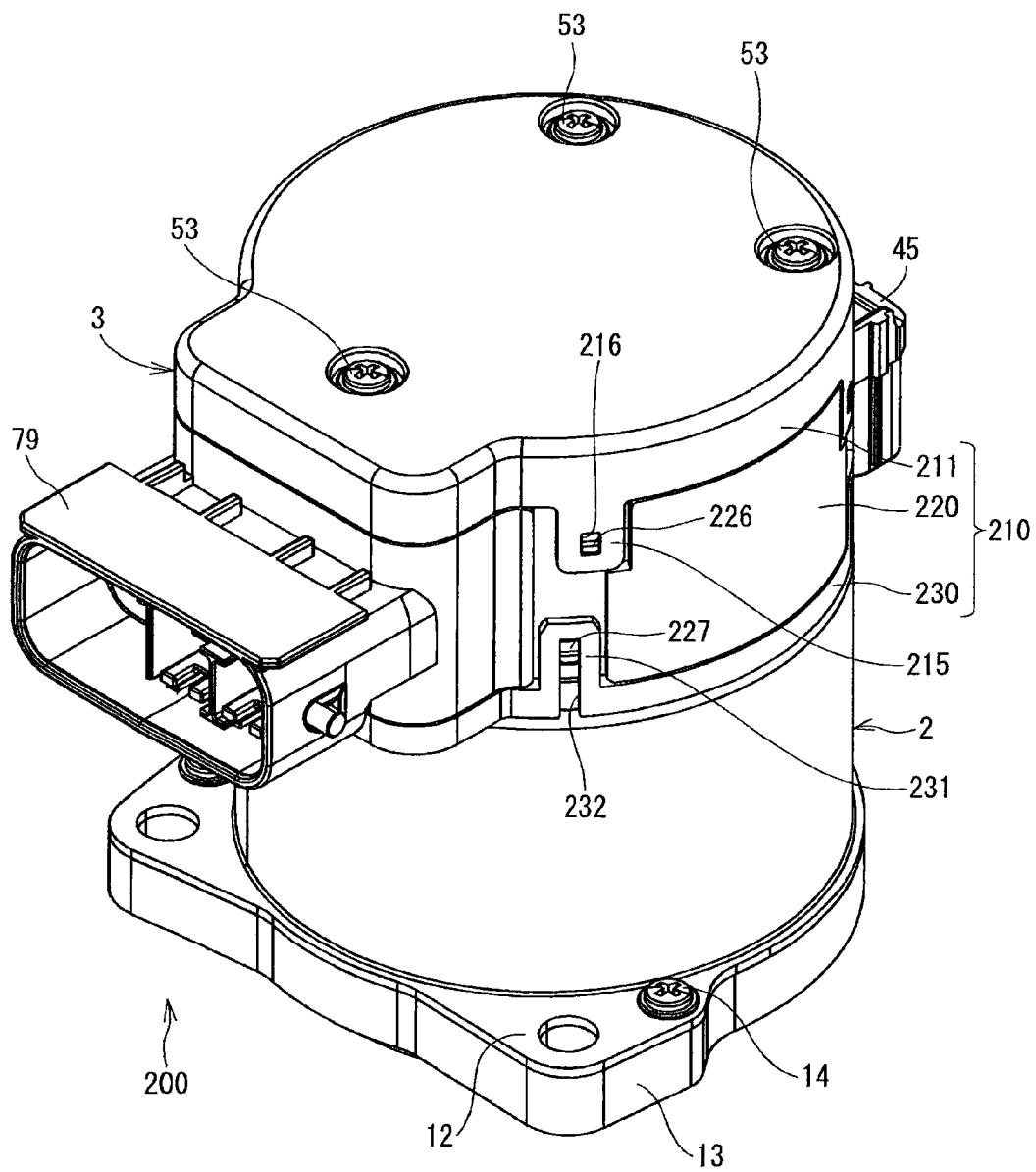
FIG. 22 is a perspective view illustrating the drive device of the second embodiment.

As shown in FIG. 22, an outer periphery of the end cover 211 has an engagement part 215 protruding toward the motor 2. The engagement part 215 is located at four positions, for example, and has an engagement hole 216.

Figure 20:
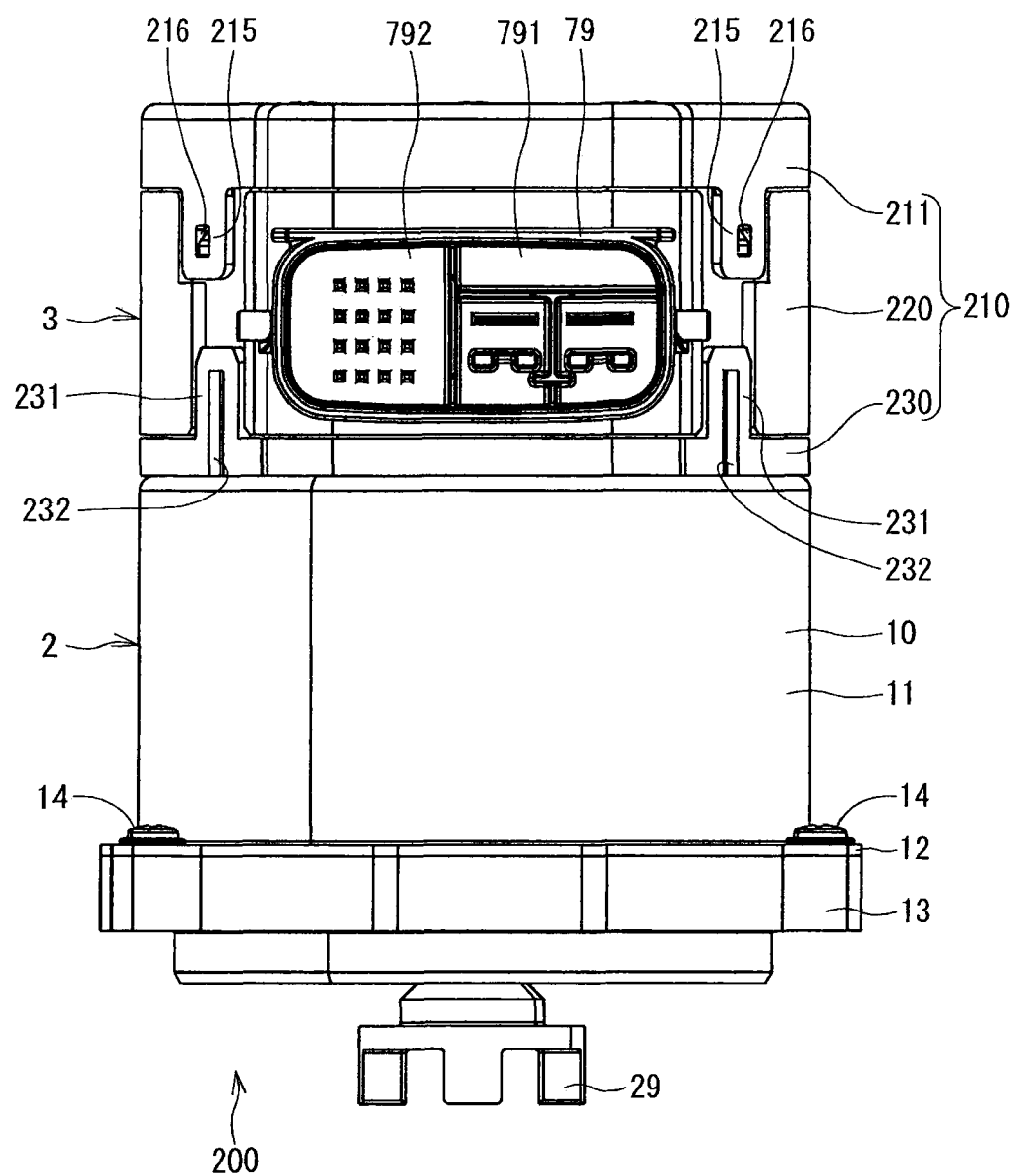
FIG. 20 is a side view seen in a direction of XX in FIG. 17.
Figure 21:
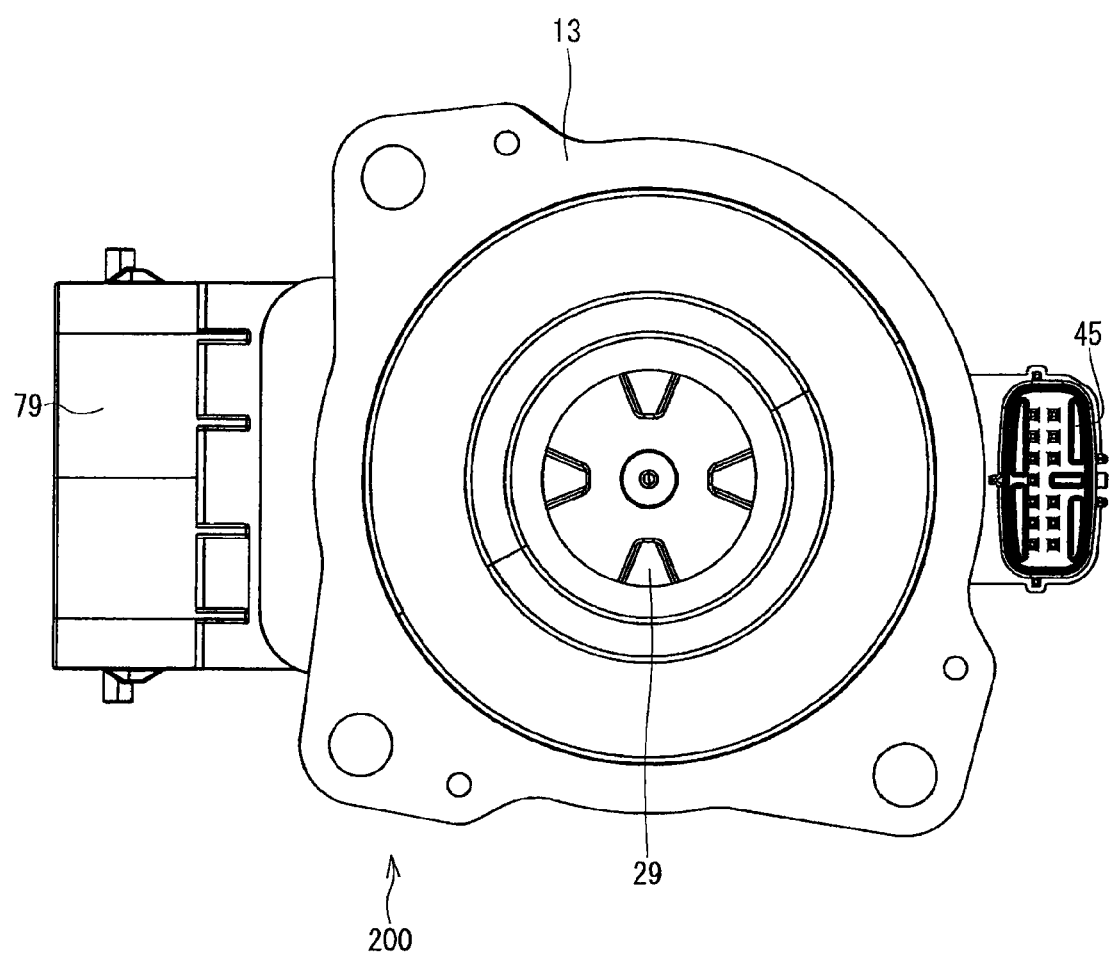
FIG. 21 is a bottom view seen in a direction of XXI in FIG. 19.

The connector holder 220 has an approximately cylindrical shape and is made of resin, for example. The connector holder 220 works as a connector to which external electronic components are connected, and defines the outer shape of the control unit 3. The connector holder 220 integrally has the control connector 45 and the power connector 79. The control connector 45 and the power connector 79 are located to oppose with each other through the rotation center of the motor 2. A wire extending from the motor 2 is connectable to the control connector 45, for example, a torque signal wire is connected to the connector 45 from the torque sensor 8. A wire extending from outside in the radial direction is connectable to the power connector 79. As shown in FIG. 20, the power connector 79 has a power source connector 791 to be connected to the power source 75, and a CAN connector 792 to be connected to the CAN. Position and connecting direction of the connector 45, 79 may be changed in accordance with the wiring construction by changing only the connector holder 220 without changing the other components.

As shown in FIG. 24, six hole parts 223 are defined in the connector holder 220, and the taken-out wire 23 passes through the hole part 223 one by one. The hole part 223 has a shape corresponding to the wire 23, and is formed to be slightly larger than the outer periphery of the wire 23. The positioning of the wire 23 is determined by passing through the hole part 223, and the wire 23 is held by the hole part 223 so as to extend in a predetermined direction. Because the connector holder 220 is made of resin, insulation between the wires 23 and insulation between the wire 23 and the motor case 10 are secured.

Figure 23:
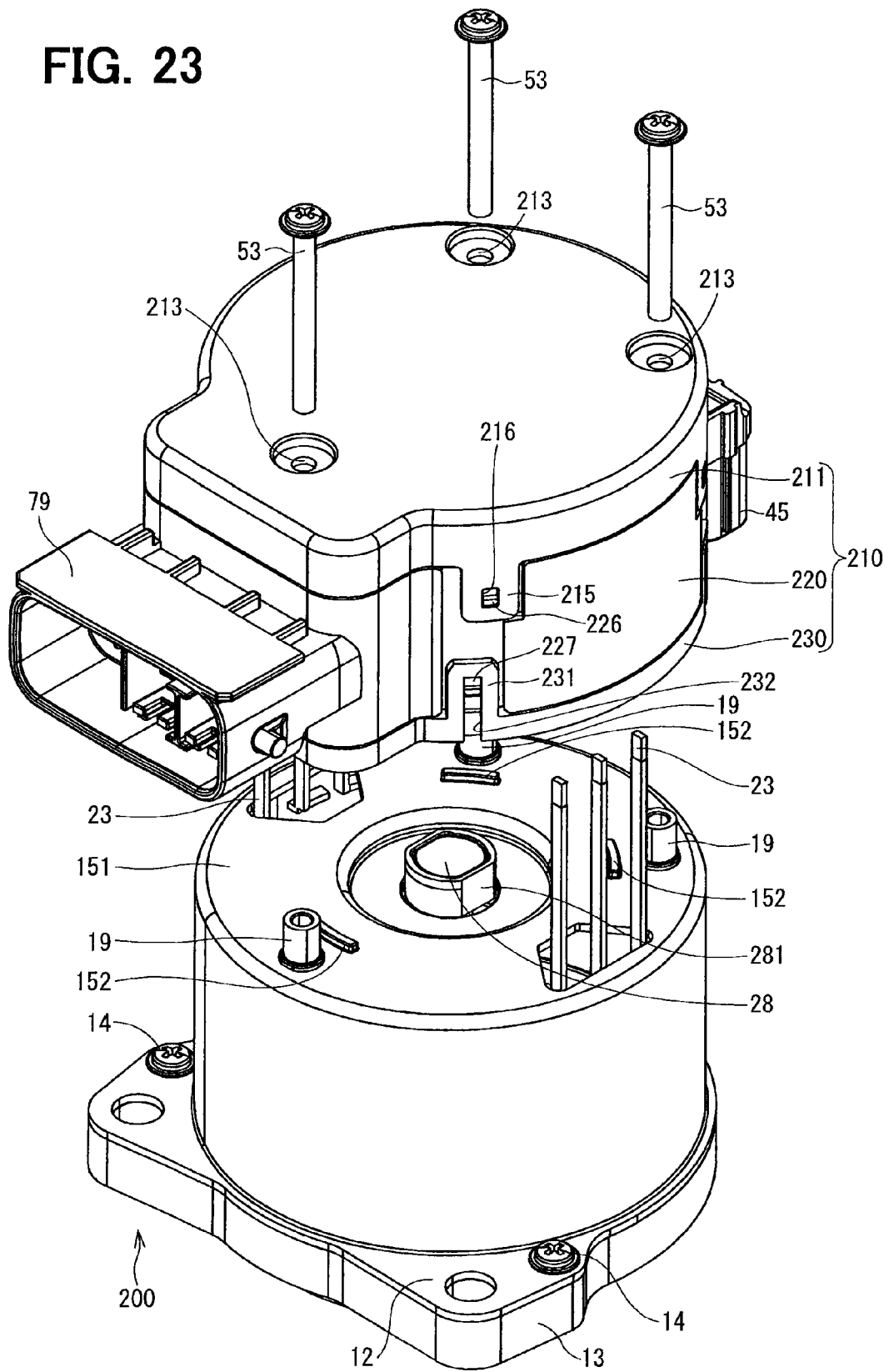
FIG. 23 is an exploded perspective view illustrating the drive device of the second embodiment.
Figure 24:
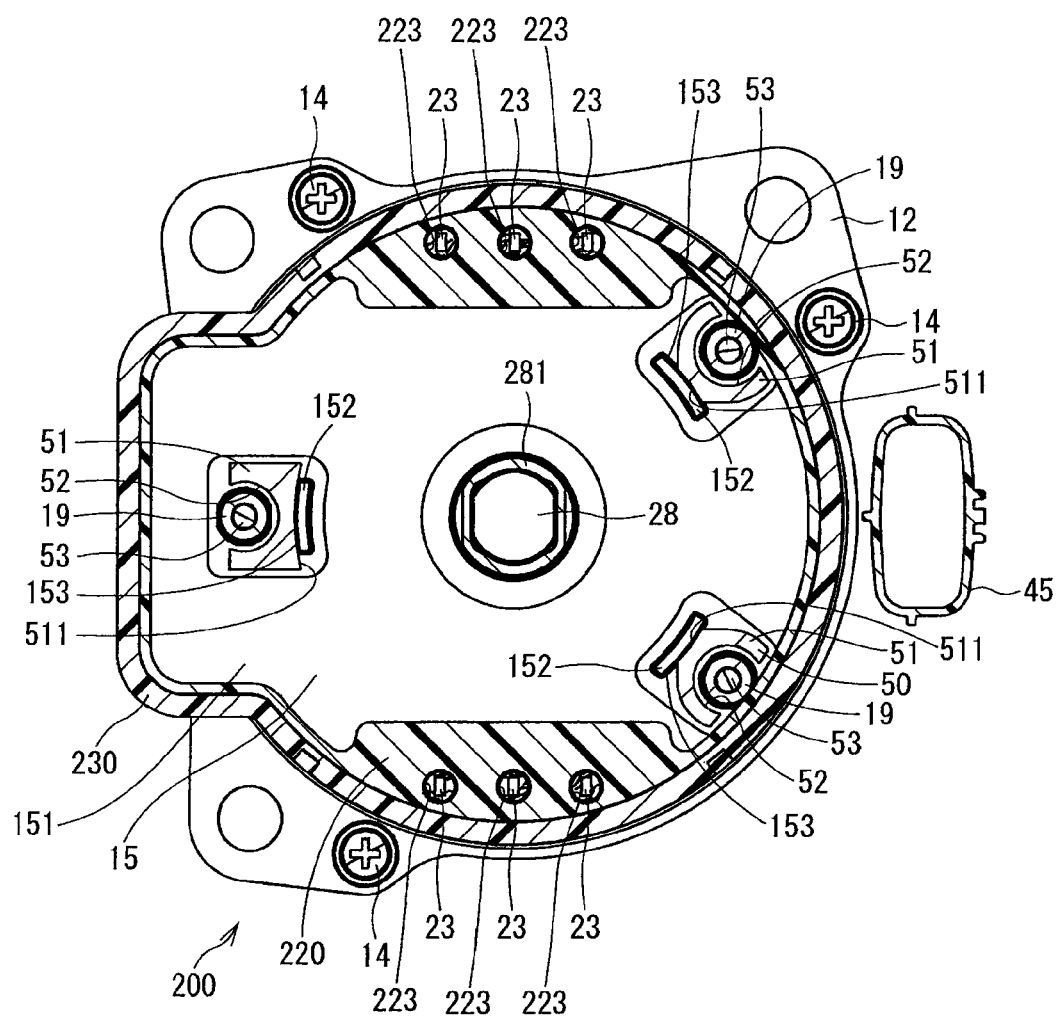
FIG. 24 is a cross-sectional view taken along line XXIV-XXIV in FIG. 18.

As shown in FIG. 23, an outer circumference wall of the connector holder 220 has a projection 226 at a position corresponding to the engagement part 215 of the end cover 211. The projection 223 is inserted into the engagement hole 216 of the engagement part 215, thereby the end cover 211 is fixed to the connector holder 220 using snap fit structure. Further, the outer circumference wall of the connector holder 220 has a projection 227 at a position corresponding to an engagement part 231 of the holder 230 to be mentioned later. The projection 227 is inserted into an engagement groove 232 of the engagement part 231, thereby the holder 230 is fixed to the connector holder 220 using snap fit structure. Thus, the end cover 211, the connector holder 220 and the holder 230 are easily assembled, so as to form the outer shape of the control unit 3.

The holder 230 of the second embodiment corresponds to the holder 30 of the first embodiment. While the holder 30 is provided to the motor 2, the holder 230 is provided to the control unit 3. The holder 230 constructs the cover 210 defining the outer shape of the control unit 3. The outer periphery of the holder 230 has the engagement part 231 protruding to the opposite side of the motor 2. The engagement part 231 is defined at four positions, for example, and has the engagement groove 232 to which the projection 227 of the connector holder 220 is fixed using the snap fit structure.

The control unit 3 has the end cover 211 that forms the outer shape opposite from the motor 2 in the axis direction. The through bolt 53 is tightened with the column 19 through the end cover 211. Therefore, the motor 2 and the control unit 3 can be easily disconnected from each other by releasing the tightening between the column 19 and the through bolt 53 from the opposite side of the motor 2. If malfunction is generated in one of the motor 2 and the control unit 3, the one having the malfunction can be exchanged with new one after disconnecting the motor 2 and the control unit 3 from each other. Thus, the number of the repairing processes can be reduced. Moreover, the same advantages can be obtained as the first embodiment.

(Other Embodiment)

The first fastener may be constructed by the column having the female thread and the second fastener may be constructed the through bolt having the male thread. Alternatively, the first fastener may have the male thread and the second fastener may have the female thread.

The positioning part may have a shape other than the protrusion, such as groove, for the fitting with the heat sink (inlaid structure), and may determine the position of other member of the control unit other than the heat sink.

The holder may be made of metal or other material other than resin.

The control unit may have only one board, that is, one of the control board and the power board. The winding wire and the power module may be directly connected with each other without the power board.

In the above embodiment, the power module has plural switching elements. Alternatively, the semiconductor module may be arranged for each of the switching elements. The location of the power module is not limited to the above description. The power module may be arranged to have right or other angle relative to the revolving shaft of the motor.

Such changes and modifications are to be understood as being within the scope of the present invention as defined by the appended claims.

What is claimed is:
1. A drive device comprising:
a motor including
a motor case having a cylindrical shape that defines an outer shape of the motor,
a stator arranged in the motor case in a radial direction,
a winding wire wound around the stator so as to define plural phases,
a rotor arranged in the stator in the radial direction, the rotor being rotatable relative to the stator, and
a shaft rotated with the rotor;
a control unit including
a semiconductor module having a switching element which switches electricity supply to the winding wire,
a receiving member that receives the semiconductor module, and
a board electrically connected with the semiconductor module, wherein the control unit is arranged on a side of the motor in an axis direction of the motor;
a first fastener arranged in a wall part of the motor case opposing to the control unit, on an inner side of a peripheral wall of the motor case in the radial direction; and
a second fastener tightened with the first fastener so as to connect the motor and the control unit with each other, wherein
the receiving member has a leg that contacts the wall part of the motor case,
the leg has a through hole extending in the axis direction of the motor,
the first fastener is inserted into the through hole of the leg from a side of the motor, and
the second fastener is inserted into the through hole of the leg from a side of the control unit.
2. The drive device according to claim 1, wherein
the wall part of the motor case has a positioning member on a face opposing to the control unit, and
the positioning member determines positions of the motor and the control unit in the radial direction.
3. The drive device according to claim 2, wherein
the positioning member has a shape fitting with the receiving member.
4. The drive device according claim 1, further comprising:
a rotation angle sensor that detects a rotation angle of the shaft and that is arranged on the board, wherein
the wall part of the motor case has a shaft hole, an end portion of the shaft adjacent to the control unit is exposed to the control unit from the shaft hole,
the end portion of the shaft has an object to be detected by the rotation angle sensor, the object rotating with the shaft, and
the rotation angle sensor is located to oppose to the object.
5. The drive device according to claim 4, wherein
the object and the rotation angle sensor are coaxially arranged on a rotation center line of the shaft.
6. The drive device according to claim 1, wherein
the second fastener has a male thread part,
the first fastener is a column having a female thread part tightened with the male thread part, and
the first fastener is arranged in a hole defined in the wall part of the motor case.
7. The drive device according to claim 1, wherein
the first fastener has a closure part that closes an end of the first fastener opposing to the motor in the axis direction.
8. The drive device according to claim 1, wherein
the control unit has an end cover defining an outer shape of the control unit opposite from the motor in the axis direction, and
the second fastener is tightened with the first fastener through the end cover.
9. The drive device according to claim 1, wherein
the wall part of the motor case has a positioning member on a face opposing to the control unit, and
a face of the leg of the receiving member and a face of the positioning member of the motor case of the motor contact with each other such that the positioning member determines positions of the motor and the control unit in the radial direction.
10. The drive device according to claim 1, wherein
the first fastener comprises a column having a cylindrical shape,
the motor and the control unit are directly connected with each other through the column,
the wall part of the motor case has a column attachment hole to which the column is attached,
the column has an internal thread part inserted in the column attachment hole, a closure part having a diameter larger than that of the column attachment hole, and the internal thread part is projected toward the control unit and is inserted in the through hole.

11. The drive device according to claim 10, wherein the second fastener comprises a through bolt, and the through bolt is tightened with the column inside the through hole.

12. The drive device according to claim 1, wherein the first fastener defines a threaded hole and a closure part fully closing one end of the threaded hole.

13. The drive device according to claim 12, wherein the closure part includes an annular surface directly engaging the motor case.

14. The drive device according to claim 1, wherein the through hole in the leg has a first diameter at the side of the motor and a second diameter at the side of the control unit, the second diameter being smaller than the first diameter.

15. The drive device according to claim 1, wherein the motor case is a single piece component defining a cylindrical shaped exterior wall and the wall part extending radially inward from the cylindrical shaped exterior wall.

* * * * *